US012597060B2

(12) United States Patent

Konakalla

(10) Patent No.: US 12,597,060 B2

(45) Date of Patent: Apr. 7, 2026

(54) GENERATIVE APPAREL RECOMMENDATIONS USING IMAGES OF A PERSON DURING THE COURSE OF A COMMUNICATIONS SESSION AMONG USERS

(71) Applicant: Pyxer Inc., Cupertino, CA (US)

(72) Inventor: Neha Konakalla, Cupertino, CA (US)

(73) Assignee: Pyxer Inc., Cupertino, CA (US)

( * ) Notice: Subject to any disclaimer, the term of this patent is extended or adjusted under 35 U.S.C. 154(b) by 0 days.

(21) Appl. No.: 19/187,334

(22) Filed: Apr. 23, 2025

(65) Prior Publication Data

US 2025/0252477 A1     Aug. 7, 2025

Related U.S. Application Data

(63) Continuation-in-part of application No. 18/797,407, filed on Aug. 7, 2024, now Pat. No. 12,288,242.

(Continued)

(51) Int. Cl.
*G06Q 30/00* (2023.01)
*G06F 40/35* (2020.01)
(Continued)

(52) U.S. Cl.
CPC ......... *G06Q 30/0631* (2013.01); *G06F 40/35* (2020.01); *G06F 40/40* (2020.01);
(Continued)

(58) Field of Classification Search
CPC ..... G06Q 30/0631; G06F 40/35; G06F 40/40; G06V 20/66; G06T 11/001; G06T 11/60; G06T 2200/24; G06T 2210/16
See application file for complete search history.

(56) References Cited

U.S. PATENT DOCUMENTS 11,232,506 B1    1/2022  Zielnicki
11,431,660 B1 *  8/2022  Leeds ..................... G10L 15/22
(Continued)

OTHER PUBLICATIONS

PR Newswire: "FaceCake Makes the Dream Closet a Virtual Reality: With the Infinite Virtual Closet™, Augmented Reality and AI-Driven personalized style advice deliver a shoppable digital wardrobe with endless possibilities," Jun. 23, 2021; Dialog #2544035236, 3 pgs. (Year: 2021).

*Primary Examiner* — Robert M Pond
(74) *Attorney, Agent, or Firm* — Cognition IP, P.C.; Edward Steakley

(57) ABSTRACT

Methods and systems provide generative apparel recommendations within a conversational platform. In one embodiment, the system generates, using an visual AI (artificial intelligence) model, one or more new images depicting a person in an input image with one or more different apparel items and/or hair styles than depicted in the input image. The system inputs the one or more AI generated new images into a visual AI model where the visual AI model being trained to identify apparel patterns and accessory, apparel and/or clothing item components. The system identifies, by the visual AI model, apparel patterns from the input one or more AI generated new images and extracts accessory, apparel and/or clothing item components. The system curates a set of apparel items based on at least the extracted accessory, apparel and/or clothing item components. The system provides for display, via a user interface, the curated set of apparel items.

20 Claims, 17 Drawing Sheets

Related U.S. Application Data

(60) Provisional application No. 63/531,291, filed on Aug. 7, 2023.

(51) Int. Cl.

| | | |
|---|---|---|
| *G06F 40/40* | (2020.01) | |
| *G06Q 30/0601* | (2023.01) | |
| *G06T 11/00* | (2006.01) | |
| *G06T 11/60* | (2006.01) | |
| *G06V 20/66* | (2022.01) | |

(52) U.S. Cl.
CPC ............ *G06T 11/001* (2013.01); *G06T 11/60* (2013.01); *G06V 20/66* (2022.01); *G06T 2200/24* (2013.01); *G06T 2210/16* (2013.01)

(56) References Cited

U.S. PATENT DOCUMENTS

| | | | |
|---|---|---|---|
| 2017/0076011 A1 | 3/2017 | Gannon | |
| 2017/0270581 A1* | 9/2017 | Tang ................. | G06Q 30/0643 |
| 2019/0325498 A1 | 10/2019 | Clark | |
| 2020/0302506 A1* | 9/2020 | Parker ............... | G06Q 30/0631 |
| 2020/0402214 A1 | 12/2020 | Mukherjee et al. | |
| 2021/0390430 A1 | 12/2021 | Aristizabal | |
| 2022/0005152 A1 | 1/2022 | Yun et al. | |
| 2024/0161423 A1* | 5/2024 | Sholl ...................... | G06V 10/24 |
| 2024/0257215 A1* | 8/2024 | Parhar ................... | G06Q 50/01 |
| 2024/0370658 A1* | 11/2024 | Zhang ................. | G06F 40/242 |

* cited by examiner

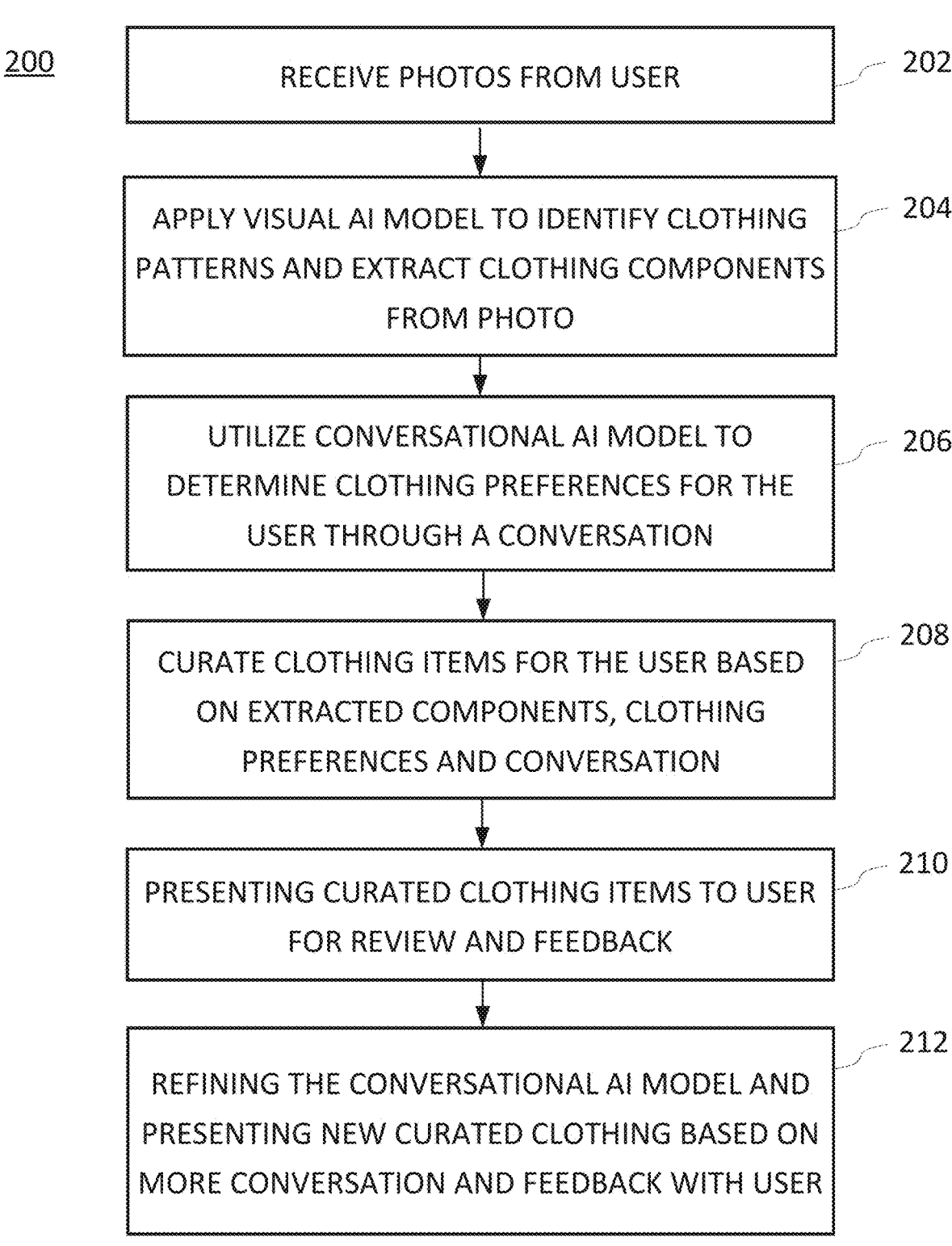

200

RECEIVE PHOTOS FROM USER — 202

APPLY VISUAL AI MODEL TO IDENTIFY CLOTHING PATTERNS AND EXTRACT CLOTHING COMPONENTS FROM PHOTO — 204

UTILIZE CONVERSATIONAL AI MODEL TO DETERMINE CLOTHING PREFERENCES FOR THE USER THROUGH A CONVERSATION — 206

CURATE CLOTHING ITEMS FOR THE USER BASED ON EXTRACTED COMPONENTS, CLOTHING PREFERENCES AND CONVERSATION — 208

PRESENTING CURATED CLOTHING ITEMS TO USER FOR REVIEW AND FEEDBACK — 210

REFINING THE CONVERSATIONAL AI MODEL AND PRESENTING NEW CURATED CLOTHING BASED ON MORE CONVERSATION AND FEEDBACK WITH USER — 212

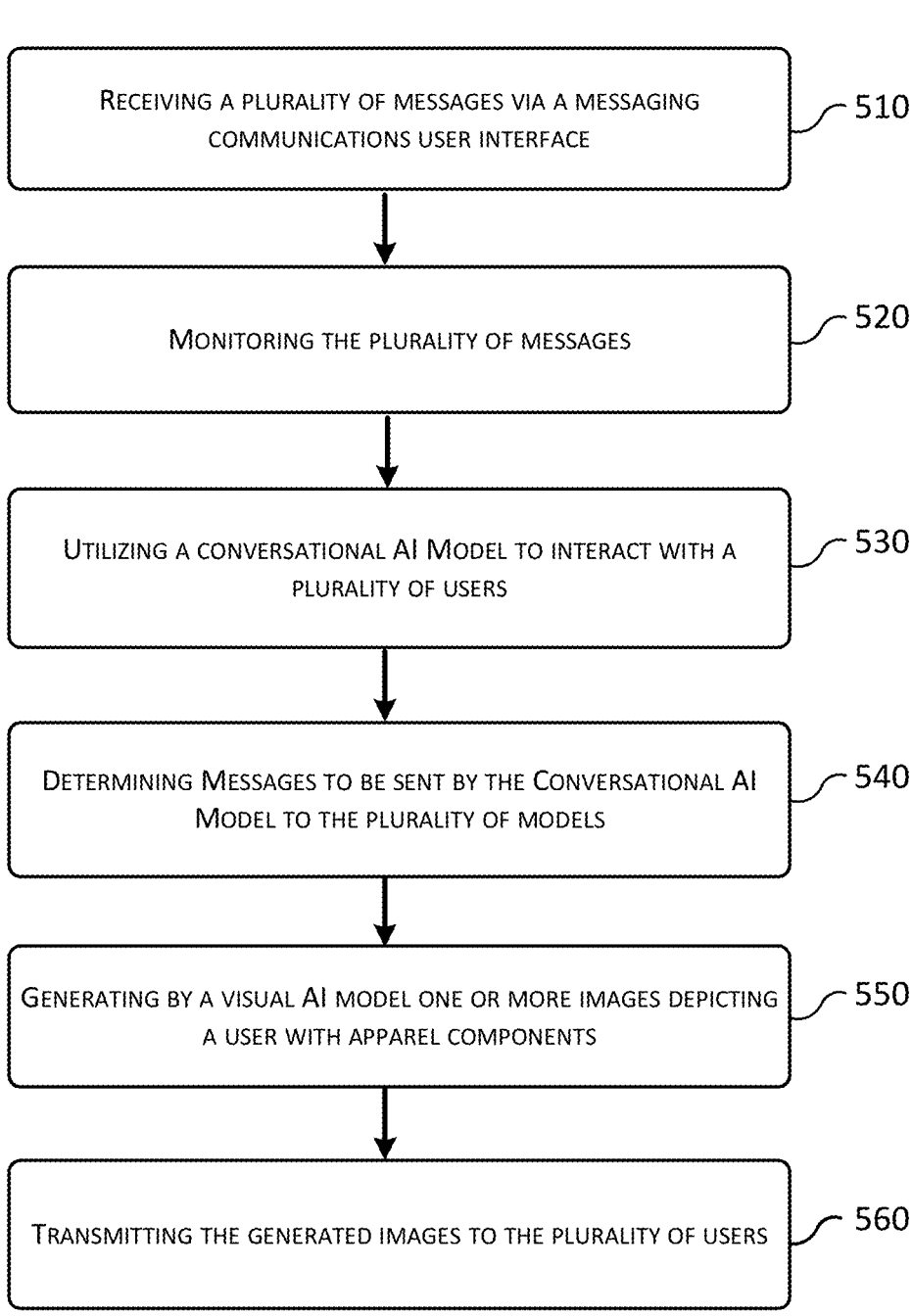

RECEIVING A PLURALITY OF MESSAGES VIA A MESSAGING COMMUNICATIONS USER INTERFACE — 510

MONITORING THE PLURALITY OF MESSAGES — 520

UTILIZING A CONVERSATIONAL AI MODEL TO INTERACT WITH A PLURALITY OF USERS — 530

DETERMINING MESSAGES TO BE SENT BY THE CONVERSATIONAL AI MODEL TO THE PLURALITY OF MODELS — 540

GENERATING BY A VISUAL AI MODEL ONE OR MORE IMAGES DEPICTING A USER WITH APPAREL COMPONENTS — 550

TRANSMITTING THE GENERATED IMAGES TO THE PLURALITY OF USERS — 560

600
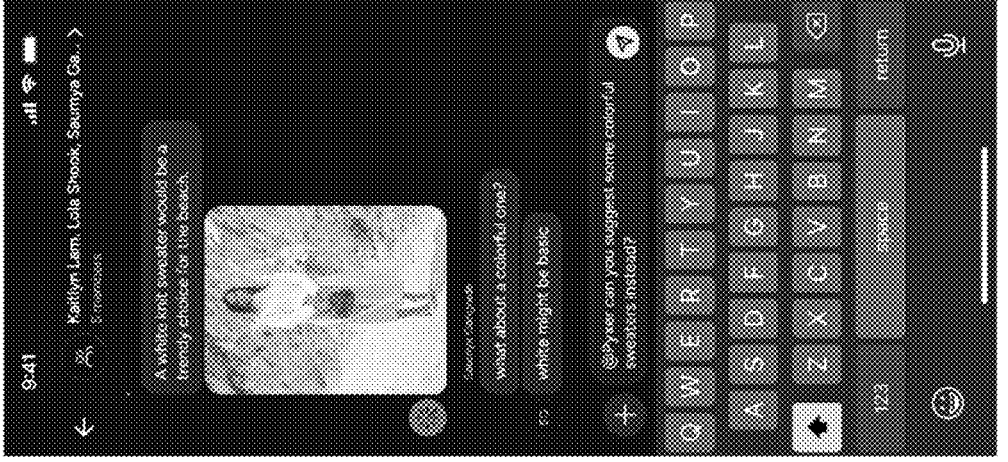
FIG. 6G
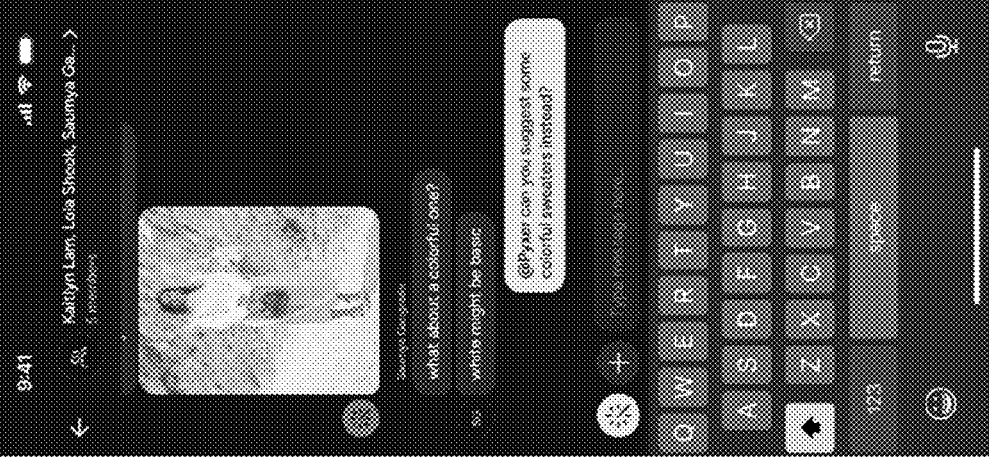
FIG. 6H
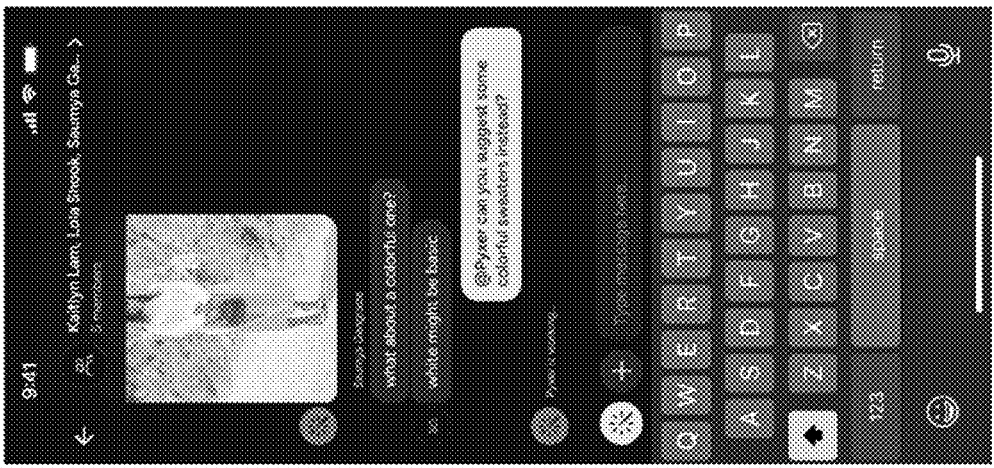
FIG. 6I

600

700

800

800

800

900

GENERATIVE APPAREL RECOMMENDATIONS USING IMAGES OF A PERSON DURING THE COURSE OF A COMMUNICATIONS SESSION AMONG USERS

CROSS-REFERENCE TO RELATED APPLICATIONS

This application is a continuation in part application claiming priority to U.S. non-provisional application Ser. No. 18/797,407, filed on Aug. 7, 2024, which claims priority to U.S. provisional application 63/531,291 filed on Aug. 7, 2023, which are incorporated herein by reference.

FIELD OF INVENTION

Various embodiments relate generally to digital communication, and more particularly, to systems and methods for providing generative clothing recommendations within a conversational platform.

SUMMARY

The appended claims may serve as a summary of this application.

BRIEF DESCRIPTION OF THE DRAWINGS

The present invention relates generally to digital communication, and more particularly, to systems and methods providing for providing generative apparel recommendations within a conversational platform.

The present disclosure will become better understood from the detailed description and the drawings, wherein:

FIG. 2 is a flow chart illustrating an exemplary method that may be performed in some embodiments.

FIG. 5 is a flow chart illustrating an exemplary method that may be performed in some embodiments.

FIGS. 6A-6K are exemplary user interface illustrating conversational dialogue in a messaging embodiment.

DETAILED DESCRIPTION

Figure 1A:
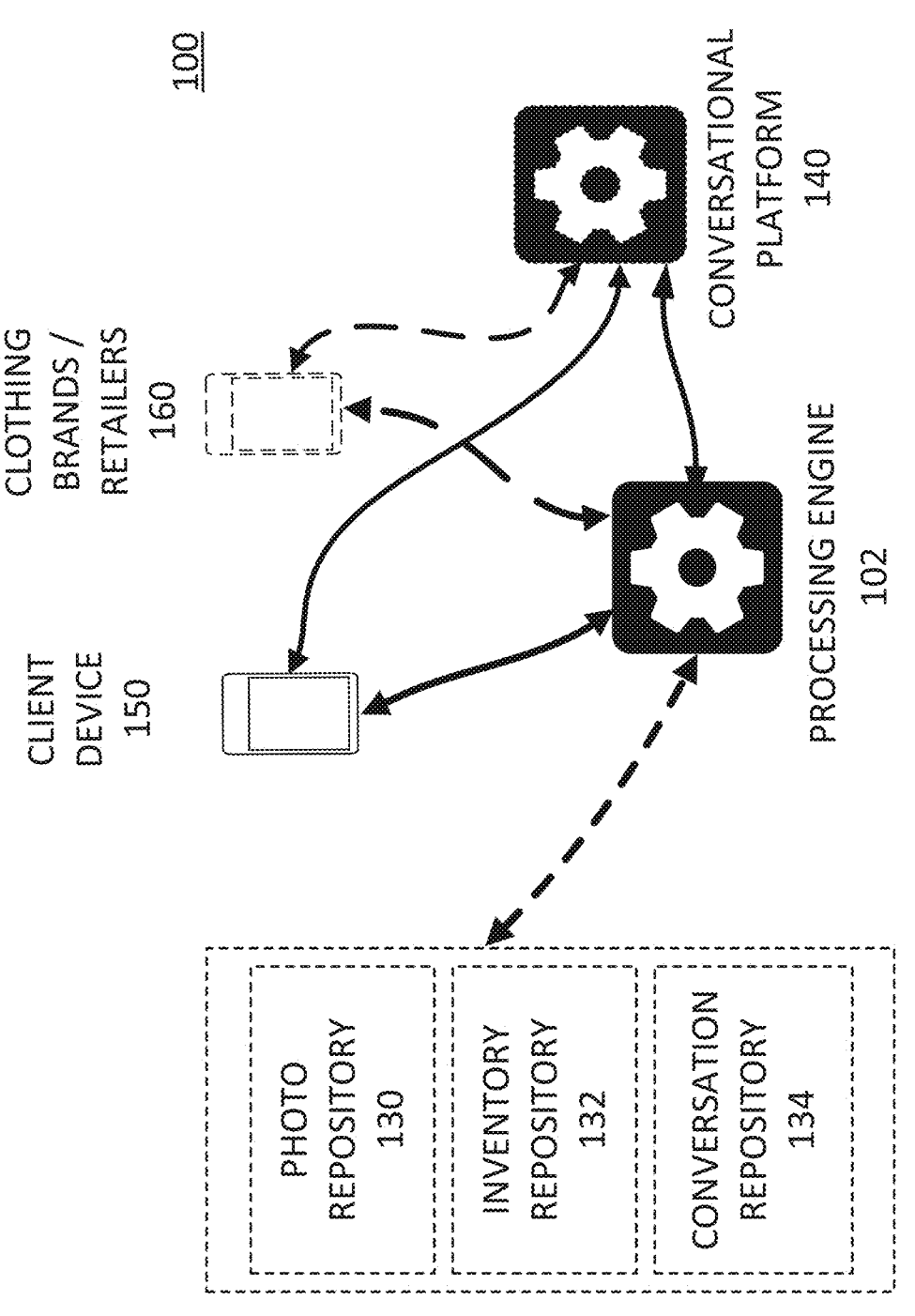
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Digital communication tools and platforms have been essential in providing the ability for people and organizations to communicate and collaborate remotely, e.g., over the internet. Applications for casual friendly conversation ("chat"), work meetings or gatherings, asynchronous work or personal conversation, and more have exploded in popularity. Many allow for participants to enter a conversation using any of a wide variety of devices and allow for switching between different devices in the middle of a conversation. It has also become common for such applications to allow for documents and media (such as images, video, or audio) to be uploaded to a server, where they can then be transmitted to other chat participants.

The field of online shopping has undergone significant transformations in recent years. While e-commerce platforms have enabled users to explore a vast array of products from the comfort of their homes, the process of finding personalized and visually appealing clothing options remains a challenge. Conventional online shopping interfaces often lack the ability to offer tailored clothing recommendations that resonate with an individual's unique preferences, style, and existing wardrobe. As a result, individuals often waste many hours finding preferred clothing and deals across various brands. As described herein, apparel and clothing may be used interchangeably.

In recent years, solutions driven by artificial intelligence (AI), such as machine learning techniques, have emerged to enhance the online shopping experience. More recently, virtual assistants and chatbots have increased in popularity. These solutions are often provided to users within the context of social media services and online retail sites. However, these experiences often require individuals to share their personal profile information and personal details within a public space, which many are not comfortable with for privacy reasons. Furthermore, current systems predominantly focus on gathering user preferences through explicit inputs and offer recommendations based on predetermined algorithms. AI-driven solutions have so far fallen short in providing holistic recommendations that consider what a user already tends to wear in particular environments.

Thus, there is a need in the field of digital communication tools and platforms to create a new and useful system and method for providing generative clothing recommendations within a conversational platform. The source of the problem, as discovered by the inventors, is the lack of an AI-driven platform that seamlessly blends generative clothing recommendations with a conversational interface, allowing users to not only receive personalized suggestions based on what they actually wear, but also engage in dynamic interactions to refine and customize their selections.

In one embodiment, the system receives one or more photos from the user, the photos depicting the user wearing various clothing items; applies a visual AI model to identify clothing patterns from the one or more photos and extract clothing components from the photos; utilizes a conversational AI model to interact with the user, where the conversational AI model determines a set of clothing preferences for the user through a conversation comprising one or more conversational interactions; curates a set of clothing items for the user based on at least the extracted clothing components, the set of clothing preferences and the one or more conversational interactions; presents the curated set of clothing items to the user for review and feedback; and continuously refines the conversational AI model and presents new curated clothing items over time based on additional conversational interactions and feedback.

In another embodiment, the system receives one or more photos from the user, the photos depicting the user wearing various clothing items; applies a visual AI model to identify clothing patterns from the one or more photos and extract clothing components from the photos; utilizes a conversational AI model to interact with the user, where the conversational AI model determines a set of clothing preferences for the user through a conversation including one or more conversational interactions; generates one or more virtual pieces of clothing for the user based on at least the user's identified clothing patterns, the determined clothing preferences, and the one or more conversational interactions, wherein each generated virtual piece of clothing is overlaid upon at least a subset of the extracted clothing components within one of the received photos of the user within the region; displays the one or more photos of the user with the overlaid generated virtual pieces of clothing; and continuously refines the conversational AI model and presents new generating virtual pieces of clothing over time based on additional conversational interactions and feedback.

In another embodiment, the system receives one or more photos from the user, the photos depicting the user wearing various clothing items; applies a visual AI model to identify clothing patterns from the one or more photos and extract clothing components from the photos; utilizes a conversational AI model to interact with the user, where the conversational AI model determines a set of clothing preferences for the user through a conversation including one or more conversational interactions; generates one or more virtual pieces of clothing for the user based on at least the user's identified clothing patterns, the determined clothing preferences, and the one or more conversational interactions, wherein each generated virtual piece of clothing is overlaid upon at least a subset of the extracted clothing components within one of the received photos of the user within the region; displays the one or more photos of the user with the overlaid generated virtual pieces of clothing; performs a similarity match to determine one or more matches between the generated virtual pieces of clothing and one or more inventory items; presents at least one of the inventory items as an output of the similarity match; and continuously refines the conversational AI model and presents additional inventory items over time based on additional conversational interactions and feedback.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150, one or more additional client device(s) 160, and a conversational platform 140 are connected to a processing engine 102. The processing engine 102 is optionally connected to one or more repositories and/or databases. Such repositories and/or databases may include, for example, a photo repository 130, an inventory repository 132, and a conversation repository 134. One or more of such repositories may be combined or split into multiple repositories. The client device 150 and additional client device(s) 160 in this environment may be computers, and the conversational platform 140 and processing engine 102 may be, in whole or in part, applications or software hosted on a computer or multiple computers which are communicatively coupled via remote server or locally.

The exemplary environment 100 is illustrated with only one client device associated with a participant, one additional client device for another participant, one processing engine, and one conversational platform, though in practice there may be more or fewer additional client devices, processing engines, and/or conversational platforms. In some embodiments, the client device, additional client device(s), processing engine, and/or conversational platform may be part of the same computer or device.

In an embodiment, the processing engine 102 may perform the method 200 (FIG. 2) or other method herein and, as a result, provide for user-prompted group actions in a shared space hosted by a communication platform. In some embodiments, this may be accomplished via communication with the client device, additional client device(s), processing engine 102, conversational platform 140, and/or other device(s) over a network between the device(s) and an application server or some other network server. In some embodiments, one or both of the processing engine 102 and conversational platform 140 may be an application, browser extension, or other piece of software hosted on a computer or similar device, or in itself a computer or similar device configured to host an application, browser extension, or other piece of software to perform some of the methods and embodiments herein.

In some embodiments, the processing engine 102 performs processing tasks partially or entirely on the client device 102 in a manner that is local to the device and relies on the device's local processor and capabilities. Additional such processing engine(s) 102 may reside on additional client device(s) 160 and perform processing tasks partially or entirely on those additional client device(s) 160. In some embodiments, the processing engine 102 may perform processing tasks in a manner such that some specific processing tasks are performed locally, such as, e.g., visual AI processing tasks, while other processing tasks are performed remotely via one or more connected servers. In yet other embodiments, the processing engine 102 may processing tasks entirely remotely.

In some embodiments, client device 150 and additional client device(s) 160 may each be devices with a display configured to present information to a user of the device. In some embodiments, the client device 150 and additional client device(s) 160 present information in the form of a user interface (UI) with UI elements or components. In some embodiments, the client device 150 and receiving client device(s) 160 send and receive signals and/or information to the processing engine 102 pertaining to the communication platform. In some embodiments, client device 150 and additional client device(s) 160 are computer devices capable of hosting and executing one or more applications or other programs capable of sending and/or receiving information. In some embodiments, the client device 150 and/or additional client device(s) 160 may be a computer desktop or laptop, mobile phone, virtual assistant, virtual reality or augmented reality device, wearable, or any other suitable device capable of sending and receiving information. In some embodiments, the processing engine 102 and/or conversational platform 140 may be hosted in whole or in part as an application or web service executed on the client device 150 and/or additional client device(s) 160. In some embodiments, one or more of the communication platform 140, processing engine 102, and client device 150 or additional client device(s) 160 may be the same device. In some embodiments, the conversational platform 140 and/or the client device 150 and additional client device(s) 160 are associated with one or more particular user accounts.

In some embodiments, optional repositories function to store and/or maintain, respectively, user photos corresponding to the user connected to the conversational platform, inventory items associated with affiliated clothing brands or retailers, and conversations including a number of conversational interactions between a user and the output interactions of a conversational AI model. The optional repositories may also store and/or maintain any other suitable information for the processing engine 102 to perform elements of the methods and systems herein pertaining to the conversational platform. In some embodiments, the optional database(s) can be queried by one or more components of system 100 (e.g., by the processing engine 102), and specific stored data in the database(s) can be retrieved.

The conversational platform is a platform configured to facilitate communication and the sending and receiving of messages, conversational input, and/or conversational interactions between a user and a conversational AI model, such as a personal assistant, chatbot, or other conversational AI output format. In some embodiments, the conversational platform may be hosted within an application that can be executed on the user's client device, such as a smartphone application. In various embodiments, through this conversational platform, users can engage in natural language conversations, enabling dynamic interactions that span from personalized clothing recommendations to insightful fashion-related discussions to generated media, including generated images tailored to the user's preferences. This will be explained in further detail in the methods described below.

Figure 1B:
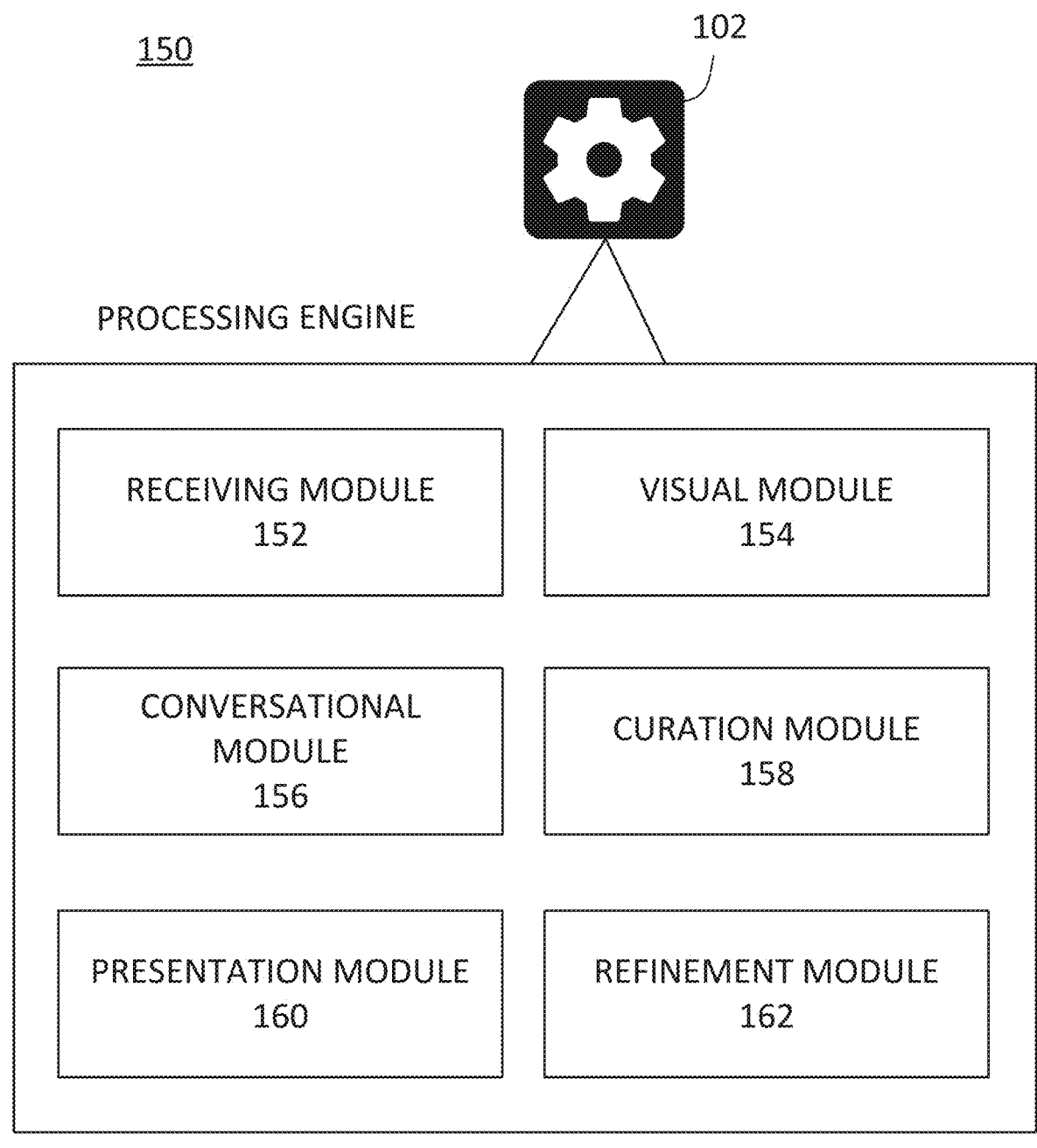
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

Receiving module 152 functions to receive one or more photos from the user, the photos depicting the user wearing various clothing items.

Visual module 154 functions to apply a visual AI model to identify clothing patterns from the one or more photos and extract clothing components from the photos.

Conversational module 156 functions to utilize a conversational AI model to interact with the user, where the conversational AI model determines a set of clothing preferences for the user through a conversation comprising one or more conversational interactions.

Curation module 158 functions to curate a set of clothing items for the user based on at least the set of clothing preferences and the one or more conversational interactions.

Presentation module 160 functions to present the curated set of clothing items to the user for review and feedback.

Refinement module 162 functions to continuously refine the conversational AI model and present new curated clothing items over time based on additional conversational interactions and feedback.

The functionality of the above modules will be described in further detail with respect to the exemplary method of FIG. 2A below.

FIG. 2A is a flow chart illustrating an exemplary method that may be performed in some embodiments.

At step 202, the system receives one or more digital photos or photographic images (hereinafter "photos") from the user, with the photos depicting the user wearing various clothing items. The photos that are received from the user serve as visual input that enables the system to comprehend the user's existing wardrobe and style choices.

In some embodiments, the user has accessed an application or piece of software which presents a user interface (hereinafter "UI") to the user relating to the conversational platform. Within this UI, the user may be presented with one or more options to provide the platform with photos of the user. In some embodiments, by navigating through these options, the user may choose to provide images in a number of ways. In some embodiments, the user may upload images directly from their personal photo library. This may be uploaded, for example, directly from the user's device, from cloud storage, or via some other method of retrieving and uploading data. In some embodiments, the user may submit, within the UI, a link or other connection to a site or service where a number of the user's photos may be accessed, such as a social media or photo service account or profile. In some embodiments, the user may be able to capture new images using their device's camera to be submitted directly within the platform.

In some embodiments, the system pre-processes the one or more photos to remove facial and arm data before applying the visual AI model. In some embodiments, prior to any information or data regarding the user photos is uploaded to a remote server, or is otherwise stored or used within the system, the system removes the facial and arm data within the photo during a pre-processing step. This ensures that the recommendation process in the method remains respectful of user privacy and prioritizes the analysis of clothing components, rather than facial elements or other data that does not need to be stored, used, or extracted. In some embodiments, the system employs computer vision techniques to accurately detect and segment regions corresponding to faces and arms within the photos. Subsequently, these identified regions are seamlessly removed from the images, leaving only the clothing components intact for analysis.

At step 204, the system applies a visual AI model to identify clothing patterns from the one or more photos and extract clothing components from the photos. This process enables the system to gain a comprehensive visual understanding of the user's clothing preferences and styles based on the received photos.

In some embodiments, the visual AI model represents a neural network architecture that is trained on large datasets of clothing imagery. In some embodiments, the visual AI model may be trained to employ machine learning techniques, machine vision techniques, and/or computer vision techniques. In some embodiments, the visual AI model operates locally on the client's device where the application is maintained and executed, making use of the local device's resources. In other embodiments, the visual AI model operates remotely without using the local device's resources.

The visual AI model is employed to conduct detailed analysis of the user's photos. In some embodiments, the model leverages deep learning techniques to detect and recognize a diverse array of clothing items and patterns within each image. In some embodiments, the model may be pre-trained to identify various categories of clothing, including, for example, tops, bottoms, outerwear, and accessories, as well as specific attributes such as colors, textures, and styles.

In some embodiments, during the identification process, the visual AI model employs cutting-edge image segmentation algorithms. By segmenting each image into distinct regions corresponding to different clothing items, the model accurately pinpoints individual elements and their spatial relationships. This segmentation process enables the extraction of clothing components, isolating them from the background and allowing for a detailed analysis of each item's attributes.

In some embodiments, the visual AI model extracts clothing components, thereby capturing a comprehensive overview of and data about the user's clothing choices across the provided images. These extracted clothing components can include detailed information about each clothing item's characteristics, such as, e.g., its type, color, pattern, and style. By processing the extracted clothing components from multiple images, the system can then construct a nuanced profile of the user's overall fashion preferences, forming the foundation for the subsequent stages of personalized clothing recommendation.

In some embodiments, the application of the visual AI model occurs with precision and accuracy in mind. The model's ability to discern intricate clothing patterns and extract components ensures that the generated clothing recommendations are aligned with the user's actual wardrobe and style choices. In some embodiments, furthermore, the visual AI model is continuously refined and optimized through iterative training processes, ensuring its proficiency in capturing and interpreting a wide spectrum of clothing attributes.

In some embodiments, the system applies the visual AI model to identify and extract background components from each of the one or more photos of the user, and further ensures that curating the set of clothing items in step 208 below is based at least on the identified background components.

In some embodiments, a photo repository is used to store photos once they are received by the system. If the user uploads the same photo again during the process of step 202, then the system may have to perform the visual processing steps of step 204 again for the photo. Alternatively, in some embodiments, the system updates the photo metadata in the user's photo library on the user's client device with the identified visual clothing components. With this approach, whenever the user uploads the same photo again, the system can simply read from the metadata, and does not need to perform the visual processing steps again.

At step 206, the system utilizes a conversational AI model to interact with the user, where the conversational AI model determines a set of clothing preferences for the user through a conversation comprising one or more conversational interactions. This process enables the system to delve into the user's clothing preferences through natural language conversations, thereby refining the generative clothing recommendation process.

In some embodiments, the conversational AI model employs an advanced neural network architecture equipped with state-of-the-art natural language processing capabilities. In some embodiments, Large Language Models (hereinafter "LLMs") or other language models may be utilized to enable the conversational AI model within the conversational platform. In some embodiments, such LLMs are trained on a large corpora of text data and are configured to comprehend and generate human-like text responses. In some embodiments, this integration of LLMs may provide the conversational platform with a capacity to understand nuanced user intentions, offer engaging interactions, and deliver personalized clothing recommendations based on the user's preferences, historical interactions, and other contextual cues. In some embodiments, furthermore, LLMs may be utilized for processing and generating various forms of media-rich content, such as, e.g., images, explanations, and detailed descriptions.

In some embodiments, the conversational AI model serves as an interactive interface between the user and the system. The user may be provided with a conversational UI as presented through the user's client device running an application for the conversational platform. Upon providing the application with the user's photos, for example, the user may then be presented with the conversational UI wherein the user can submit text via one or more text fields and receive output messages in response from the conversational AI model. In some embodiments, through a series of one or more conversational interactions, the model engages the user in a fluid and intuitive dialogue, extracting insights into the user's clothing preferences, style inclinations, and contextual factors. The model's proficiency in understanding user inputs, nuances in language, and conversational context allows it to discern a comprehensive set of clothing preferences that extend beyond visual patterns.

In some embodiments, during the conversation, the conversational AI model poses inquiries and prompts related to the user's clothing choices. These prompts may encompass queries about, e.g., preferred color palettes, style aesthetics, seasonal preferences, and/or desired clothing attributes. In some embodiments, the model may employ sentiment analysis techniques to gauge the user's emotional responses, discerning patterns in the user's expressed preferences. In some embodiments, additionally, the model can employ reinforcement learning algorithms to iteratively refine its understanding of the user's responses, thereby continuously adapting its conversational strategies to better uncover the user's clothing preferences.

In some embodiments, the conversation comprises an iterative process, during which the conversational AI model progressively synthesizes a coherent set of clothing preferences based on the user's inputs and interactions. As the user engages in the dialogue, the model amalgamates information from the conversation with the earlier extracted clothing components, forming a comprehensive profile of the user's style and preferences.

It is noteworthy that the conversational AI model is designed to facilitate a seamless and user-centric experience. In some embodiments, the model's adaptive capabilities and understanding of context allow it to navigate the conversation naturally, ensuring that the user feels engaged and understood. In some embodiments, the system can employ privacy measures to ensure the security of the conversational interactions, safeguarding user information while leveraging conversational insights to enhance the recommendation process.

In some embodiments, prior to curating the set of clothing items for the user, the system generates one or more virtual pieces of clothing for the user based on at least the user's identified clothing patterns, the determined clothing preferences, and the one or more conversational interactions. Each generated virtual piece of clothing is overlayed upon at least a subset of the extracted clothing components within one of the received photos of the user within the region. The system then displays the one or more photos of the user with the overlaid generated virtual pieces of clothing. In some embodiments, the system utilizes one or more inpainting techniques and/or object warping techniques to present each virtual piece of clothing as if overlaid on the user's original worn clothing. In some embodiments, inpainting techniques, such as the stable diffusion process or similar algorithms, are harnessed to artistically and convincingly fill in missing or altered portions of the user's clothing. By analyzing the existing clothing patterns, textures, and colors, the system intelligently infers how the recommended virtual clothing item would seamlessly integrate with the user's outfit. In some embodiments, object warping techniques are employed to precisely align and adapt the virtual clothing item to the user's body and pose within the image. Through meticulous warping and transformation processes, the system ensures that the virtual clothing drapes realistically over the user's physique, considering factors such as, e.g., body contours, folds, and lighting conditions.

In some embodiments, the system overlays the virtual piece of clothing outside the region of the extracted clothing components. This may be the case where the virtual piece of clothing is of, e.g., a longer length than the extracted clothing components, or may have larger dimensions than the extracted clothing components. For example, the system may overlay a newly generated jacket upon the user's image when the user is wearing a t-shirt in the photo. Thus, it is possible to overlay clothing outside the region of extracted clothing components as well in some cases.

Conversely, in some embodiments and for some generated pieces of clothing, the system can generate one or more predicted body components of the user based on one or more of the other received photos where those body components are visible. This may occur when the virtual piece of clothing is of a shorter length or smaller dimensions than the extracted clothing components. For example, if the user was wearing a long jacket in the photo, and the generated piece of clothing for the user is a t-shirt to be overlaid onto the user in the photo, the visual AI model would be configured to generate how the user's arms look realistically based on other received photos from the user where their arms had been visible.

In some embodiments, upon generating the one or more virtual pieces of clothing, the system performs a similarity match to determine one or more matches between the generated virtual pieces of clothing and one or more inventory items. The system then returns at least one of the inventory items as an output of the similarity match, where the curated pieces of clothing are selected from the at least one of the inventory items. In some embodiments, this similarity match is preceded by the system receiving a request from the user to search for one or more pieces of clothing that are similar to at least one of the generated pieces of clothing.

In some embodiments, to execute the similarity matching, the system employs algorithms that analyze a diverse range of attributes and characteristics. These attributes may encompass, for example, clothing type, color palette, patterns, texture, style, brand, and other relevant parameters. By assessing these attributes, the system identifies one or more matches between the generated virtual pieces of clothing and the inventory items.

In some embodiments, upon the user being presented with the generated pieces of clothing in the modified photos, the system receives one or more pieces of feedback from the user on at least one of the generated virtual pieces of clothing via one or more conversational interactions. In response to the feedback from the user, the system may then generate one or more modified versions of the at least one of the generated pieces of clothing, and displaying the one or more modified versions.

In some embodiments, in addition to the user being presented with similar items in an existing inventory to the generated pieces of virtual clothing, the user may further present the user with one or more options to connect with one or more third parties to have at least one of the generated pieces of virtual clothing custom-made for the user with real materials. Thus, rather than the generated pieces of clothing being exclusive to virtual presentation, the user may contract with one or more third parties outside of the system to prepare and manufacture at least some of the clothing to be custom-made for the user with real materials and fabrics. In some embodiments, the application and UI may allow such communication and/or contracting with individuals or organizations to take place within the application itself. In other embodiments, it takes place outside of the application, and the application directs the user to complete such communication and contracting via one or more other methods, such as chat, email, text messaging, an external website or application of the third party, or other relevant method.

At step 208, the system curates a set of clothing items for the user based on at least the extracted clothing components, the set of clothing preferences and the one or more conversational interactions. In some embodiments, this step combines the visual patterns extracted from the user's photos with the comprehensive clothing preferences derived from the conversational interactions, resulting in a personalized and nuanced selection of clothing recommendations.

In some embodiments, the curation process is underpinned by a sophisticated recommendation algorithm that harnesses the power of both visual analysis and conversational insights. The system carefully merges the user's recognized clothing patterns, as discerned from the extracted clothing components, with the multifaceted clothing preferences expressed throughout the conversation. By juxtaposing these two sources of information, the system seeks to strike a harmonious balance between the user's visual inclinations and the more abstract clothing attributes that emerge from the conversation. In some embodiments, to accomplish this, the recommendation algorithm employs advanced data fusion techniques that leverage machine learning approaches. For example, by assigning appropriate weights to the extracted clothing attributes and conversational preferences, the algorithm ascertains the most relevant and representative features for generating the curated clothing set. This fusion of visual and conversational data ensures that the resulting recommendations encapsulate both the user's distinct style captured in images and the nuanced fashion preferences that surface during the conversation.

In some embodiments, the system retrieves the clothing items that are curatorially selected from a repository of available inventory items to recommend to users. In some embodiments, the inventory of clothing items is populated based on affiliations with clothing retailers and/or brand owners which are associated with those clothing items. In some embodiments, an affiliate program and affiliate system is provided in order for clothing retailers or brand owners to sign up for affiliation in order for their clothing items to be included within the available inventory of clothing to recommend to users. In some embodiments, the affiliation may provide additional benefits which can be offered through the conversational platform, such as, for examples, discounts, deals, or coupons being offered to a user when a specific item is recommended to that user.

In some embodiments, the curated clothing set may encompass a diverse array of items spanning different categories, styles, and occasions. Each item within the set may be selected to align with the user's unique combination of visual patterns and expressed preferences, enhancing the personalization and relevance of the recommendations. In various embodiments, the system may take into account one or more factors such as, e.g., color harmony, style coherence, and the user's indicated clothing attributes, ensuring that the curated collection resonates seamlessly with the user's fashion sensibilities.

In some embodiments, extracted background components from each photo may be utilized in conjunction with the processing from the visual AI in earlier step 204 to provide recommendations of clothing items based on particular environmental contexts of the photos. For example, if there is snow in a number of the outdoors photos that were received by the system, then the system may understand the context that the user likely lives or spends significant time in a cold environment that experiences snow, and provide clothing recommendations that account for those weather and environmental conditions.

In some embodiments, the system may be configured to recommend clothing items that represent some absence or gap in the user's perceived current wardrobe based on the uploaded photos. For example, if the user's uploaded photos predominantly showcase casual wear or formal attire, the system may deduce the absence of versatile transitional pieces that seamlessly bridge the gap between these two styles. Alternatively, if certain color palettes or patterns are conspicuously absent, the system may recommend items that inject diversity and vibrancy into the user's collection.

In some embodiments, the system curates the pieces of clothing further by filtering items based on one or more pieces of personalized user information. Such personal information can be obtained from the user in a number of ways. For example, the system may be able to obtain the information via the conversational interactions if the user volunteers such information. The system may also be able to obtain some of this information from processing and analyzing the received photos. User profile information may be another source of the information. In various embodiments, such personal information may include, for example, socioeconomic and demographic information, geographical location, body type and measurements, age, physical attributes, and more.

In some embodiments, the system retrieves a set of clothing purchase data of the user. In some embodiments, the clothing purchase data is retrieved from one or more internal data sources. For example, the clothing purchases in question may have occurred within the application for the conversation platform, such that the clothing purchase data was stored internally within the application. In some other embodiments, the clothing purchase data is retrieved from one or more external data sources associated with one or more clothing retailers or ecommerce sites, where curating the set of clothing items for the user is further based on the clothing purchase data of the user. In some embodiments, the clothing purchase data is retrieved from a mix of internal and external data sources. In some embodiments, the inclusion of clothing purchase data adds an additional layer of information to the curation process, enriching the recommendations by incorporating the user's historical shopping behaviors and preferences, e.g., from their interactions with clothing retailers, ecommerce platforms, or the conversation platform. This internal and/or external data is integrated into the recommendation algorithm, providing a more comprehensive and nuanced understanding of the user's style preferences and clothing choices.

In some embodiments, the system retrieves a set of clothing trend data from one or more data sources, wherein curating the set of clothing items for the user is further based on the clothing trend data. In some embodiments, the retrieval of clothing trend data involves tapping into one or more external sources that can provide additional, comprehensive, and/or up-to-date information about, for example, the latest fashion trends, styles, color palettes, and garment preferences. These sources could include, for example, social media trends, internet retailer product inventory and announcements, fashion industry reports, celebrity endorsements, and other outlets that provide an understanding of or insight into trending fashion.

At step 210, the system presents the curated set of clothing items to the user for review and feedback. Following the curation of a personalized set of clothing items, the method seamlessly transitions into the phase of presenting this carefully crafted collection to the user for review and feedback. This pivotal step marks an interactive juncture where the user engages with the generative clothing recommendations, assessing their alignment with personal style preferences and providing valuable input.

In some embodiments, the system employs a user-friendly presentation that allows the user to explore and evaluate each item individually, gaining a comprehensive understanding of the recommended options.

In some embodiments, through the presented interface, the user is invited to engage in a detailed review of the curated clothing items. In some embodiments, each item can be accompanied by relevant details, including, e.g., images, descriptions, and attributes such as style, color, and category. This comprehensive information empowers the user to make informed assessments and comparisons, aiding in the decision-making process.

In some embodiments, the system presents the user with explanations for each of the curated clothing items, such that the user is given an explanation in clear language of why this particular piece of clothing was curated and chosen for this user. The explanation may discuss the particular factors that went into choosing the piece of clothing, such as environmental context, identified user preferences for clothing, style, texture, perceived gaps in the user's wardrobe, or any other relevant factors. In some embodiments, the user may specifically request the model to provide explanations for the specific curation of each clothing item, and the model can then present such explanations to the user.

In some embodiments, the system further encourages user engagement by providing opportunities for direct interaction with the presented clothing items. In some embodiments, users are granted the ability to select, zoom in on, and/or visualize each item more closely, simulating the experience of physically examining garments in a traditional shopping environment. This interactive engagement deepens the user's connection with the recommended clothing items, fostering a more immersive and compelling shopping experience.

As the user reviews the curated clothing set, the system solicits feedback to further refine the recommendations. Users are prompted to express their preferences, indicate their likes and dislikes, and offer suggestions for customization. This iterative feedback loop fosters a collaborative approach between the user and the system, ensuring that the recommendations become progressively attuned to the user's evolving preferences and desires.

User feedback plays a pivotal role in fine-tuning the curated clothing set and enhancing the overall recommendation process. The system leverages the feedback data to recalibrate the recommendation algorithms, prioritizing attributes and styles that resonate more strongly with the user's expressed preferences. This continuous refinement ensures that subsequent recommendations are increasingly aligned with the user's personal fashion sensibilities.

In some embodiments, a conversational thread may be presented to the user for each of the curated clothing items. For example, the user may be presented with options to provide comments, feedback, questions, or other follow-up conversation on individual clothing items presented, or may instead provide follow-up conversation directly in the main thread. In some embodiments, the user may asynchronously communicate with the conversational model along any of these conversational threads concurrently.

In some embodiments, if the user explicitly expresses preferences for specific clothing attributes, colors, or styles, the recommendation algorithm adapts and tailors the curated set accordingly and presents a newly modified set of clothing items. This iterative refinement, driven by real-time user engagement, can serve to enhance the accuracy and precision of the recommendations, further reinforcing the user's engagement and satisfaction. This iterative process can mirror that of a personal assistant who refines, adapts, and modifies recommendations based on feedback.

In some embodiments, the system can specify parameters of one or more inventory items within a similarity match performed on one or more of the curated set of clothing items, and then return at least one of the inventory items as an output of the similarity match, where the curated pieces of clothing are selected from the at least one of the inventory items. For example, in response to a curated set of clothing to be presented to the user, the user may request additional clothing items that are similar to one specific presented item. The system may perform a similarity match based on checking that one item for similarity within the available inventory items, and present the user with the results of that similarity match.

In some embodiments, the system may provide the user with one or more options for modifying one or more of the curated set of clothing items, where modifying includes changing one or more visual aspects of the clothing or changing one or more entire clothing items. That is, beyond passive recommendation, the system can allow users to directly influence and tailor the presented options, resulting in an even more tailored and engaging experience.

In some embodiments, the modification options include changing one or more visual aspects of the clothing items. Users can thus have the flexibility to fine-tune specific visual attributes of the recommended garments. This includes, e.g., adjusting colors, patterns, textures, or other aesthetic features to create a personalized and harmonious ensemble that resonates with their style sensibilities.

In some embodiments, users are provided with the option to completely replace one or more clothing items within the curated set. This ensures an accessible customization process that addresses all aspects of the user's wardrobe and desired clothing choices. Users can interact with the conversational AI model to communicate their desired modifications, providing input through natural language commands or visual cues. The system responds dynamically to user requests, recalibrating the curated set of clothing items based on the modifications specified by the user.

In some embodiments, as users engage in customization, the conversational AI model employs advanced sentiment analysis and/or reinforcement learning techniques to understand and interpret user preferences accurately.

In some embodiments, the system organizes the curated clothing items into one or more pre-defined categories based on a set of category rules. These categories can serve as conceptual containers for the user that encapsulate clothing items sharing similar attributes, characteristics, or intended usage scenarios. This categorization is performed via a set of pre-established category rules which serve as a logical framework for dictating how garments are classified and grouped. The rules may encompass a spectrum of criteria, including, e.g., garment type, color palette, appropriate context for usage, and more. For example, clothing items may be separated into "jackets", "jeans", "tops", "dresses", "shoes", and "accessories".

In some embodiments, upon presenting the curated set of clothing items, the system showcases these items within their respective categories, offering users a visually intuitive and structured browsing experience. Users can effortlessly navigate through the categories, selecting the ones that align with their current fashion considerations and aspirations.

In some embodiments, rather than the categories being pre-established, the curated clothing items can be organized into one or more generated categories based on the user's determined clothing preferences, the identified clothing patterns, one or more conversational interactions specifying categories or category rules, or similar relevant data.

In some embodiments, the system can generate one or more alternative clothing suggestions based on the user's feedback and preferences, and present at least a subset of the alternative clothing suggestions to the user. For example, if a user responds to a curated set of clothing items with an indication that they're dissatisfied with the selection in some way, then the system can generate and present an alternative set of items for the user. These alternatives can be based on one or more criteria the model considers to be relevant for that user, or can be based on specific requests for alternative selections from the user.

In some embodiments, the system can present the user the ability to view how the curated pieces of clothing would look on their own photos or in different environments. In some embodiments, the user requests this feature or selects the feature as a presented option. In some embodiments, the system can modify one or more of the received photos to replace the clothing worn by the user in the photo with the clothing item inpainted within the photo, as if the user is wearing the curated clothing item. In some embodiments, the background environment can be replaced with one or more virtual or generated background environments.

In some embodiments, the user can specify different environments or occasions to visualize how the recommended clothing items would look. For example, the user may request the model to generate a visualization of how the recommended clothing items would look in the specific setting of a wedding reception, at a fitness center, or any other suitable environment or occasion. In some embodiments, the model may then generate an image of the clothing worn in the context of this setting. In some embodiments, the clothing is inpainted over clothing within one of the received photos, and the background elements are replaced with virtual background elements generated for the image.

At step 212, the system continuously refines the conversational AI model and presents new curated clothing items over time based on additional conversational interactions and feedback. That is, the system is continuously refining the conversational AI model and presenting new curated clothing items to the user over time, a process that unfolds organically as the user engages in ongoing conversational interactions and provides feedback.

In some embodiments, over time, the conversational model, in conjunction with the recommendation system, becomes increasingly proficient in comprehending the user's clothing preferences, style inclinations, and individual nuances, thereby enabling more refined and nuanced interactions. In some embodiments, the conversational AI model employs advanced machine learning techniques, including reinforcement learning and neural network adaptation, to iteratively adjust its conversation strategies based on the user's responses and feedback.

In some embodiments, as the user engages in extended conversations, the conversational AI model demonstrates its ability to anticipate user preferences and tailor interactions accordingly. This adaptability is achieved by leveraging a continually updated dataset that encompasses both historical conversations and newly provided feedback. The model learns to recognize conversational patterns, colloquialisms, and contextual cues, enabling it to engage the user in a manner that feels increasingly personalized and intuitive.

In some embodiments, in parallel with the model's refinement, the method also involves the presentation of new curated clothing items to the user. These new recommendations are generated based on the evolving insights gained from extended conversational interactions and user feedback. As the conversational AI model becomes more adept at understanding the user's preferences, the system utilizes this enriched understanding to select clothing items that align even more closely with the user's unique style.

In some embodiments, the system enables the user to receive notification alerts for deals that match at least the determined clothing preferences of the user. Such notification alerts can provide the user with real-time updates on, e.g., recommendations, deals, or offers that align with their determined clothing preferences.

In some embodiments, upon curating the set of clothing items and presenting them to the user, as outlined in claim 1, the user can request or be provided with the option to receive notification alerts for one or more aspects of the recommendation service provided. These alerts are specifically tailored to match the user's clothing preferences and style, as discerned by the system from visual patterns and/or conversational interactions.

In some embodiments, the system incorporates an intelligent notification engine that continuously scans available deals, discounts, and promotions offered by affiliated brands and partners. Leveraging the user's established clothing preferences, the engine selectively filters through the available offers to identify those that align with the user's unique fashion inclinations. This filtering process ensures that users are only notified about deals that are relevant and appealing to their individual style preferences.

In various embodiments, the alerts can take various forms, including, e.g., text-based messages, push notifications on the user's client device (e.g., smartphone push notifications), visual notifications, or even interactive cards or similar interactive UI elements that showcase the details of the deal, including, e.g., the clothing item, price, and any associated promotional codes or links.

In some embodiments, this notification engine employs machine learning algorithms to refine its accuracy over time. By analyzing user interactions, feedback, and engagement patterns, the system hones its ability to deliver increasingly relevant and attractive deals to the user. This iterative learning process ensures that the notification alerts become more personalized and aligned with the user's evolving fashion preferences.

In some embodiments, the user retains full control over their engagement with the notification alerts. The user can, for example, choose to explore offered deals or recommendations, ignore them, or opt out of receiving notifications altogether. In some embodiments, the user may have more granular options to change how or whether recommendations are provided, how or whether deals are provided, and other relevant options.

In some embodiments, the system stores the user's favorite clothing items and preferences for future conversation sessions. In some embodiments, this may involve user interactions such as the user marking specific items as "favorites" or utilizing a designated interface element to indicate preference. These identified favorites are logged within the system's memory, creating a personalized repository of clothing items that resonate with the user's style inclinations.

In some embodiments, this may extend beyond cataloging of favorite clothing items to encompass the preservation of user preferences, including, e.g., style preferences, color palettes, size specifications, and other relevant attributes. This comprehensive retention ensures that the system can effectively tailor recommendations to the user's established preferences in future interactions.

The stored data plays a pivotal role in enriching subsequent conversation sessions. When the user engages with the conversational AI model in subsequent interactions, the system leverages the stored data to provide a seamless and cohesive experience. The AI model can intelligently reference the user's favorite clothing items, historical preferences, and past interactions to refine its recommendations and conversations.

In some embodiments, the stored data serves as a foundation for adaptive learning. The system employs machine learning techniques to analyze the stored information, identifying patterns, trends, and shifts in the user's style evolution. This adaptive learning empowers the system to continually fine-tune its understanding of the user's fashion preferences and adapt its recommendations and interactions accordingly.

In some embodiments, the visual AI model and conversational AI model are periodically updated with new data and/or improved algorithms. In some embodiments, these updates are executed at predetermined, periodic, or semi-periodic intervals, enabling the system to assimilate the latest trends, user behaviors, and technological innovations into its analytical frameworks. In some embodiments, new data is received in the form of additional or expanded datasets which are used to train or fine-tune the visual AI model and/or conversational AI model. In some embodiments, the visual AI model may be trained upon, for example, contemporary fashion images or new product items at retailers, enhancing its ability to recognize and analyze evolving clothing patterns, styles, and aesthetics. In some embodiments, the conversational AI model benefits from enriched conversational datasets, allowing it to better comprehend and engage in natural language interactions, ultimately improving the accuracy and contextuality of user preferences.

Figure 3A:
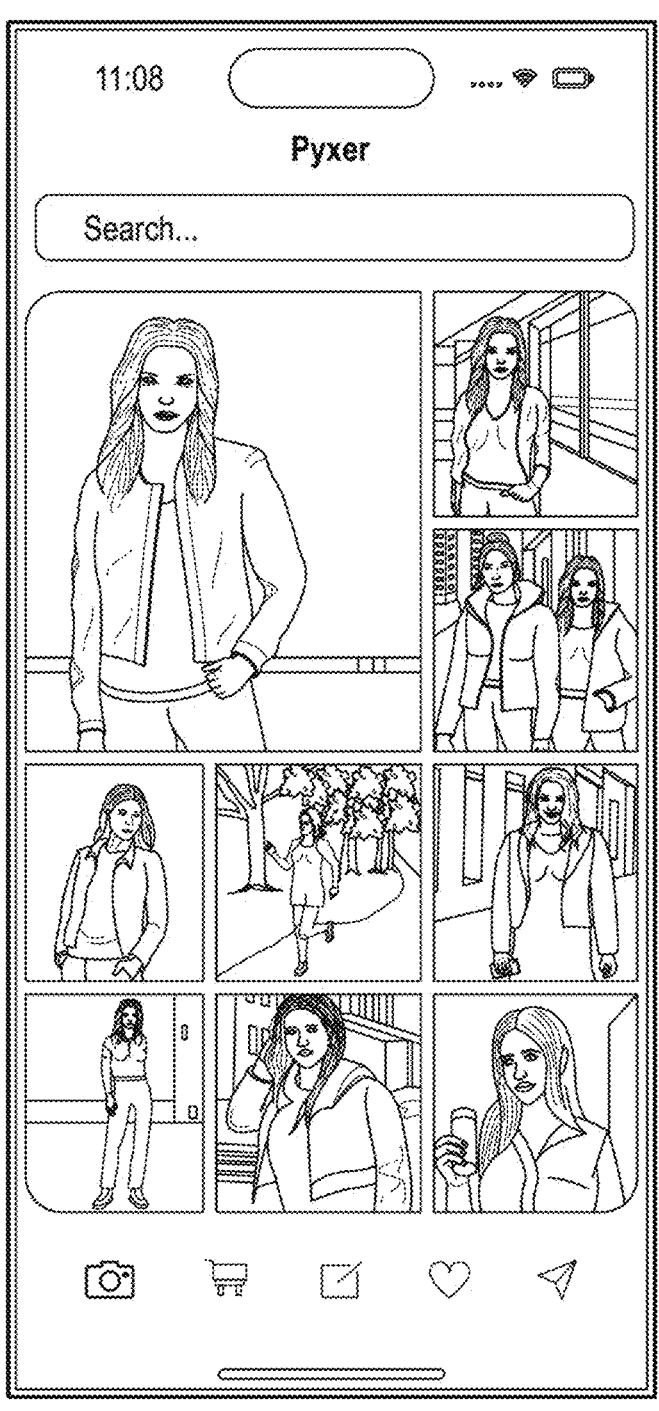
FIG. 3A is a diagram illustrating one example embodiment of receiving photos from a user.

FIG. 3A is a diagram illustrating one example embodiment of receiving photos from a user.

Within the example embodiment, the user has been presented with a UI for the conversational platform with one or more options for providing photos for submission to the platform. The user has selected the option to manually upload images from the user's client device, a smartphone with built-in camera features, as can be seen by the user selecting the camera icon within the UI. The user has uploaded several photos depicting the user in different clothing and in different environments. These are displayed within the UI in a grid-style layout.

Figure 3B:
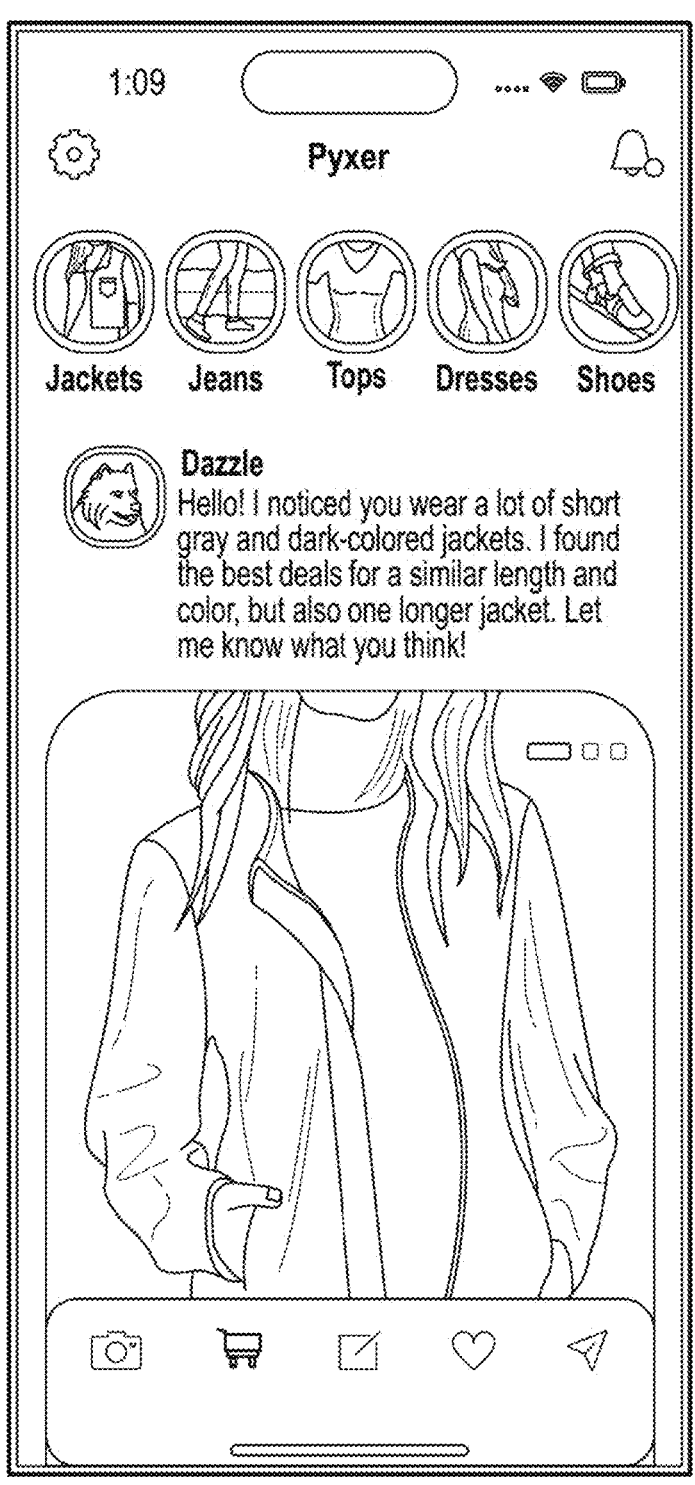
FIG. 3B is a diagram illustrating on example embodiment of a curated piece of apparel presented to the user within a conversational platform.

FIG. 3B is a diagram illustrating on example embodiment of a curated piece of clothing presented to the user within a conversational platform.

Upon the user in FIG. 3A providing the photos, the system processes and analyzes the photos using a visual AI model. The visual AI model identifies the clothing patterns within the provided photos and extracts clothing components from the photos. The system then utilizes a conversational AI model to interact with the user. Through the conversational interactions, user preferences are determined. The user may also opt to rename the conversational AI model according to their preferences, such as in the example where the model is renamed to "Dazzle". The system curates a set of clothing items to the user based on the clothing preferences and conversational interactions, as well as the extracted clothing components from the photos. The system then presents the clothing items to the user within the UI for the user's review and feedback. The user has the opportunity to provide further conversational interaction based on each of the presented items, and based on the user's feedback, comments, and/or questions, the system continuously refines the conversational AI model and presents new curated clothing items throughout the course of additional conversational interactions.

In some embodiments, the system generates one or more images of a person wearing various clothing items using a visual AI model to generate a new image using an input image of the person. For example, the system provides a user interface that may receive an input image. Typically, the image would be an image of the user, possibly a length image depicting the user from their head to their feet. The system uses this image to then generate, via the visual AI model, a new image displaying the person. The visual AI model may change various aspects of the image, such as a hair style of the person, clothing of the person, fashion accessories (such as jewelry, hats, scarves or glasses) of the user. The system may provide an input to the system to cause the system to generate another image with new or different clothing components. The system performs this process to generate different AI generated images examples from which the user can select or identify as an image depicting the user wearing preferred clothing components, hair styles or fashion accessories.

In some embodiments, the system, using one or more processors, performs the operations of inputting an image into a trained visual AI model, where the image depicts a person. The system generates one or more new images depicting the person with one or more different clothing items and/or hair styles than depicted in the input image. The system inputs the AI generated images into the same or another trained visual AI model where the visual AI model has been trained to identify clothing patterns and clothing components. The system identifies by the visual AI model, clothing patterns from the AI generated images extracts clothing components from the one or more images. The system curates a set of clothing items based on at least the extracted clothing components. The system provides for display, via a user interface, the curated set of clothing items. In some embodiments, a trained visual AI model that generates the new images of the person also extracts the clothing component from the generates new images.

Figure 4:
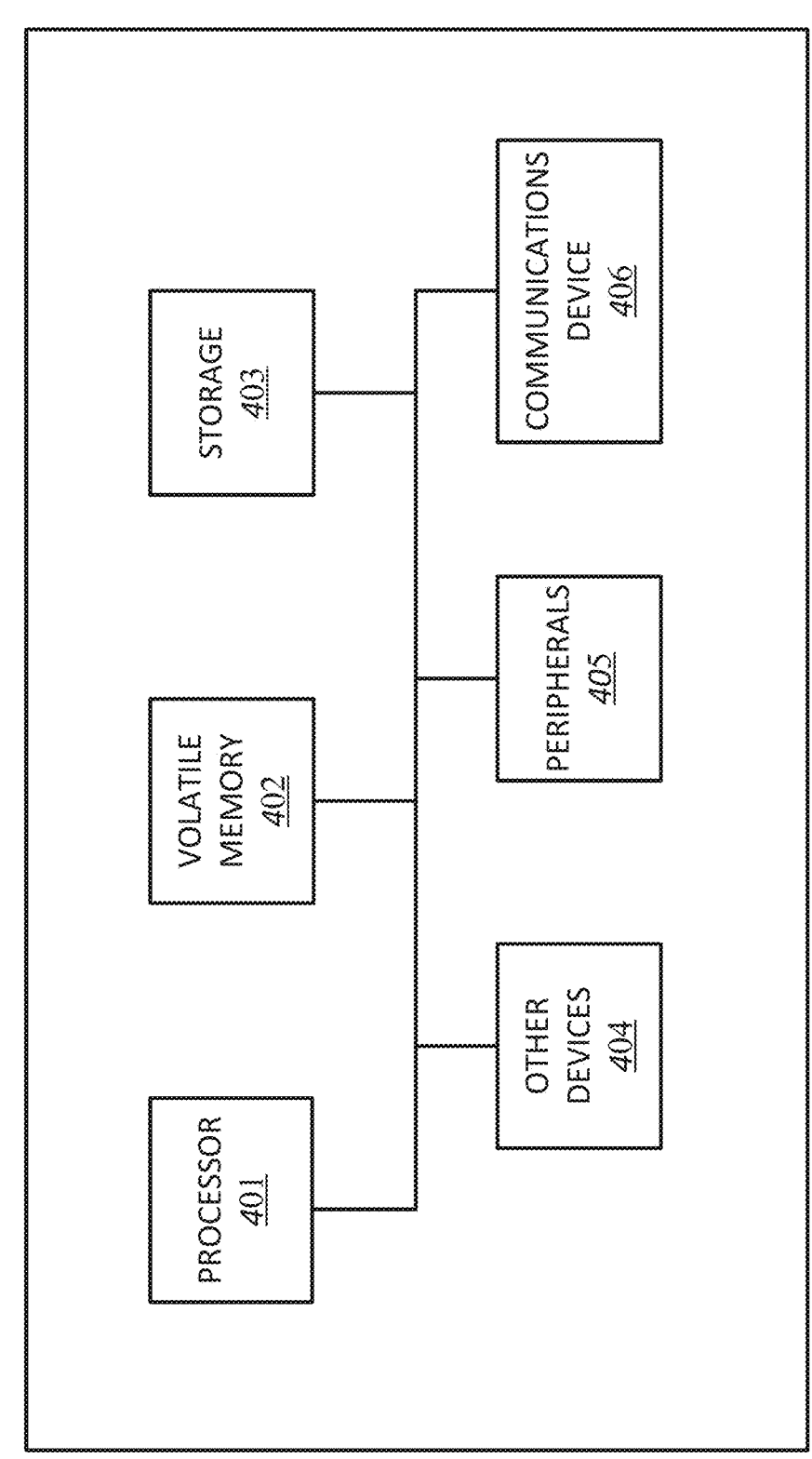
FIG. 4 is a diagram illustrating an exemplary computer that may perform processing in some embodiments.
Figure 6C:
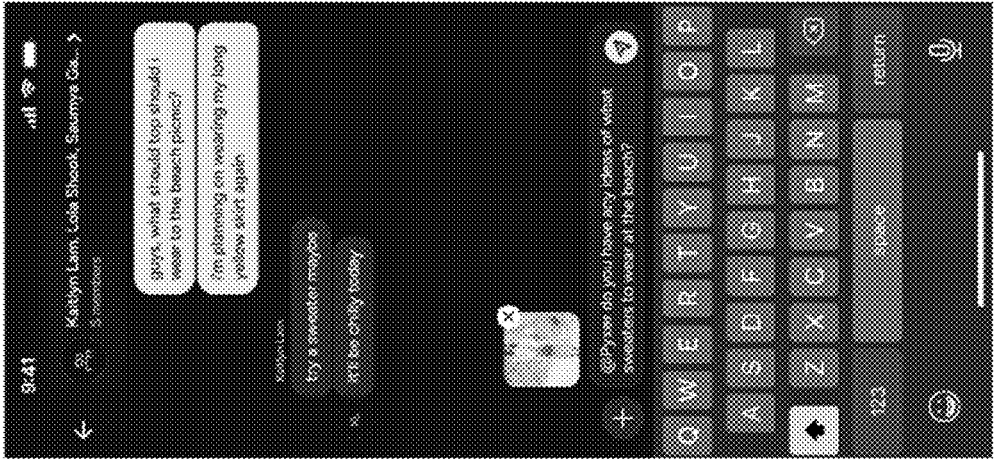
Figure 6B:
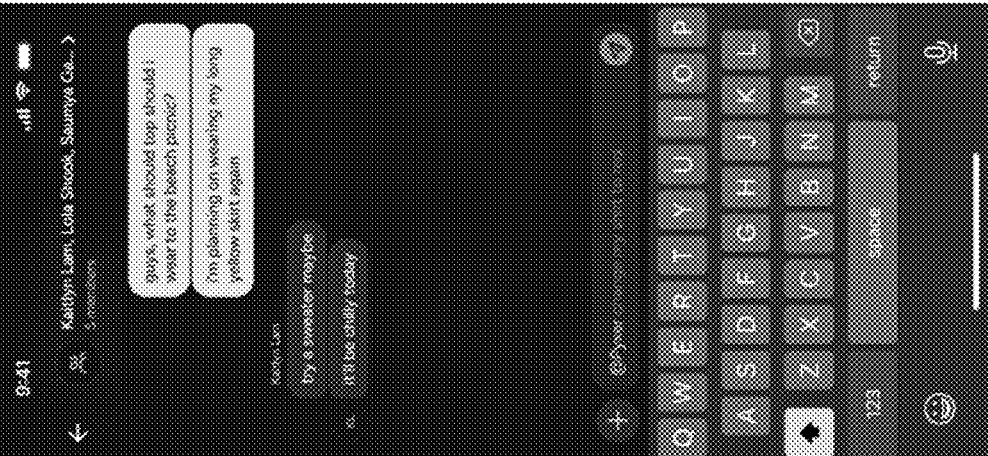
Figure 6A:
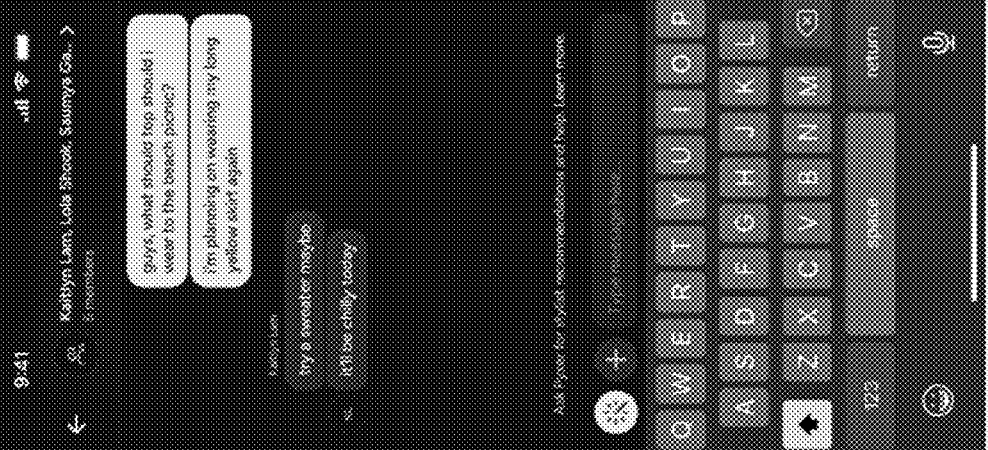
Figure 6F:
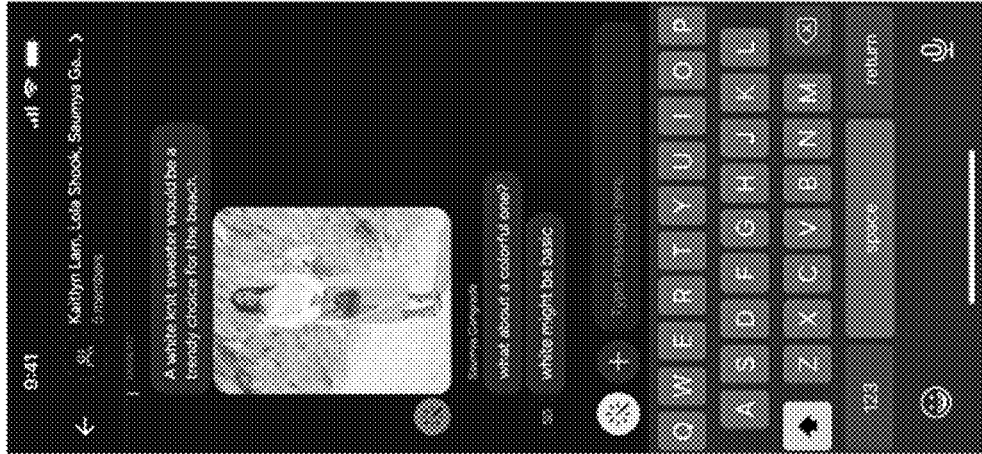
Figure 6E:
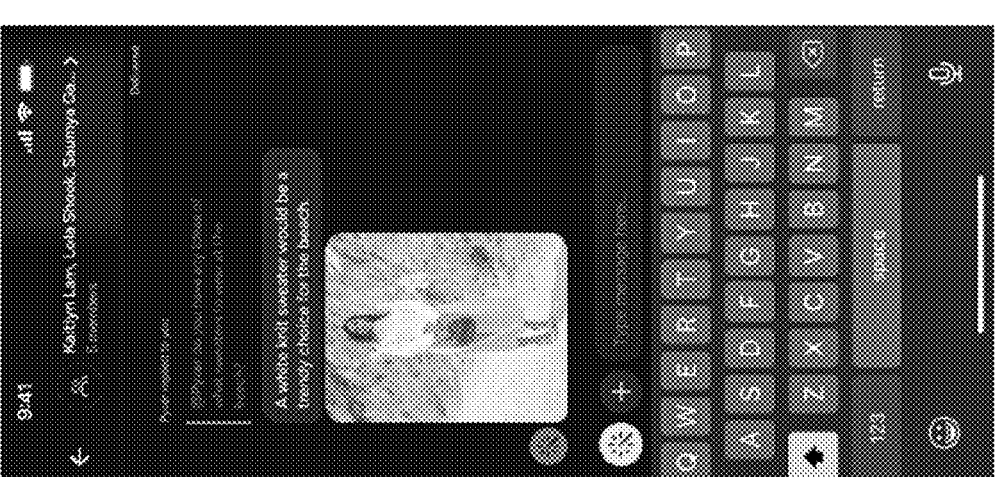
Figure 6D:
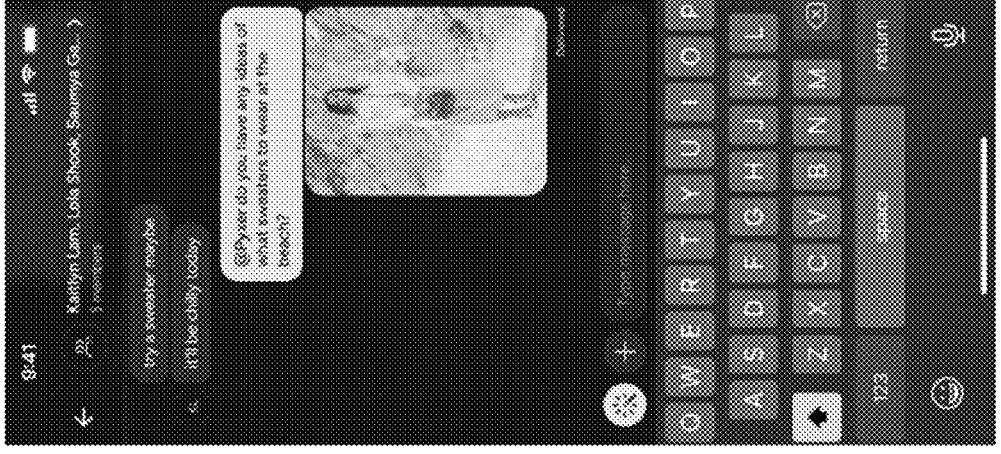
Figure 6K:
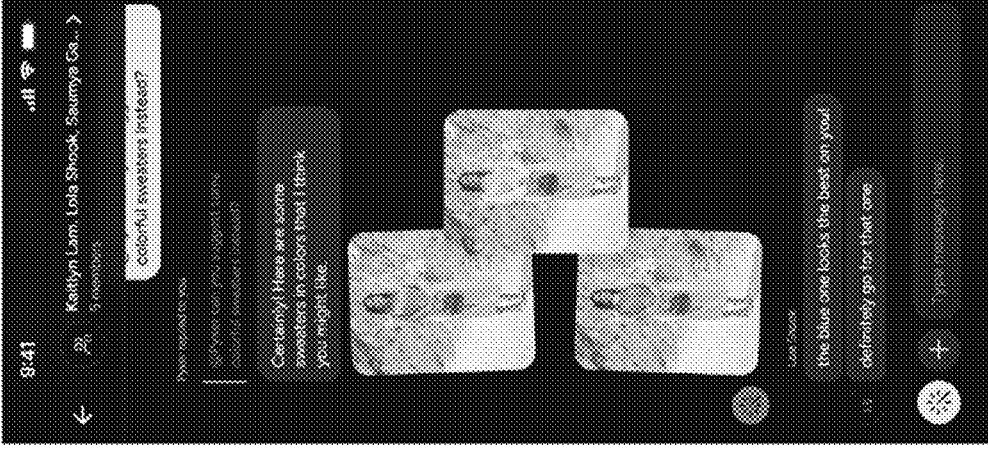
Figure 6J:
Figure 7C:
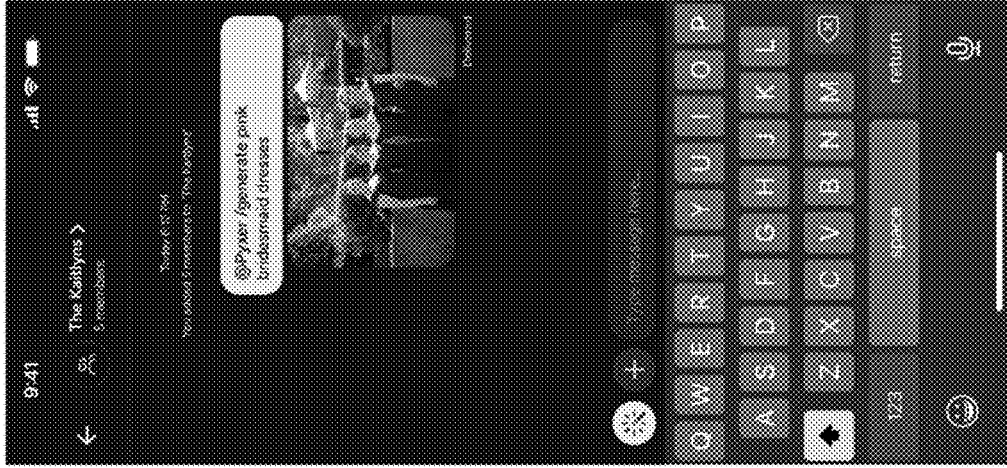
FIGS. 7A-7D are exemplary user interface illustrating conversational dialogue in a messaging embodiment.
Figure 7B:
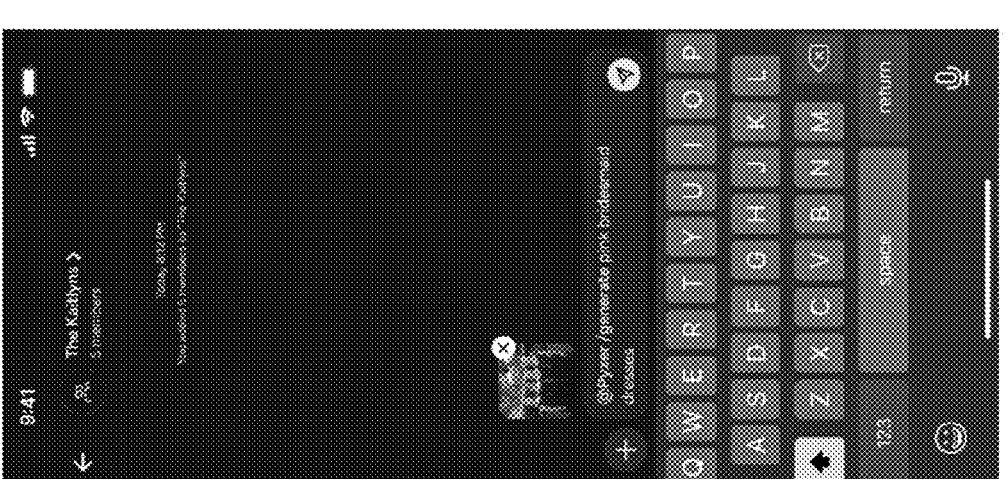
Figure 7A:
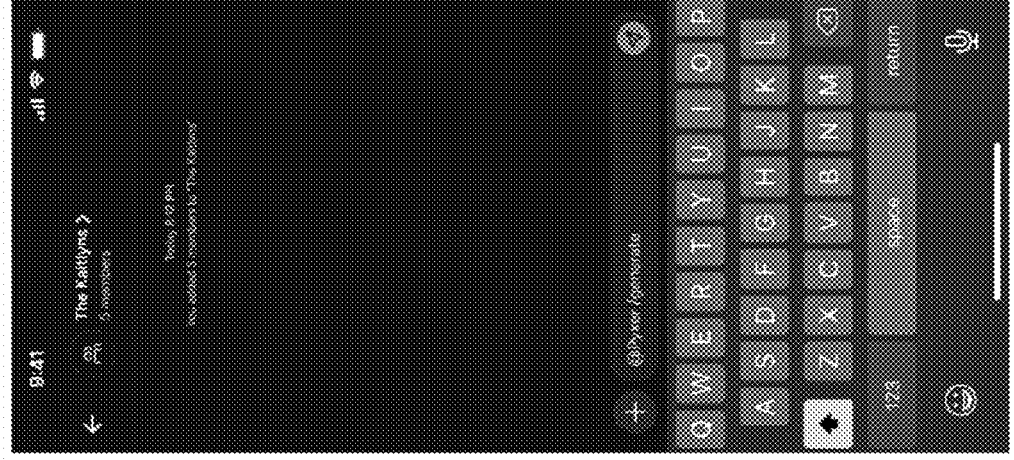
Figure 7D:
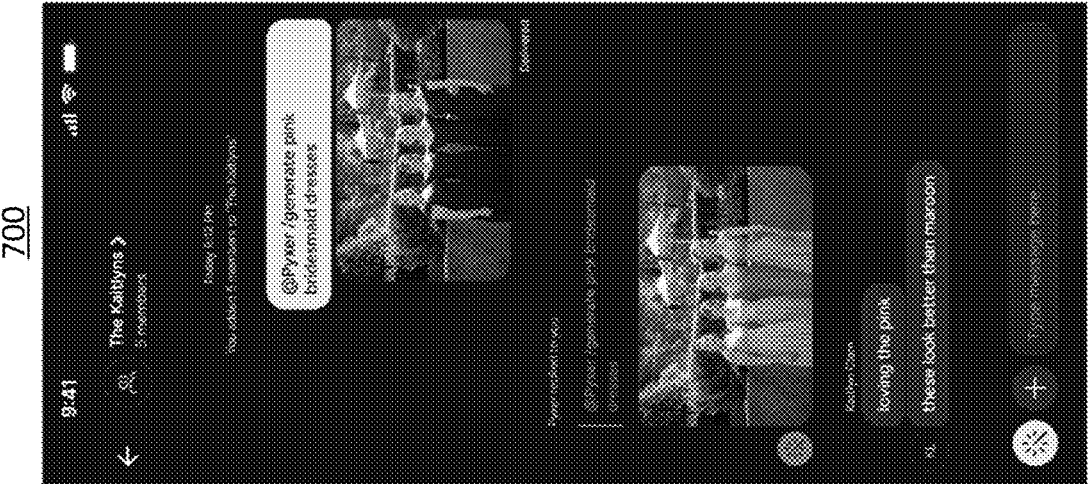
Figure 8C:
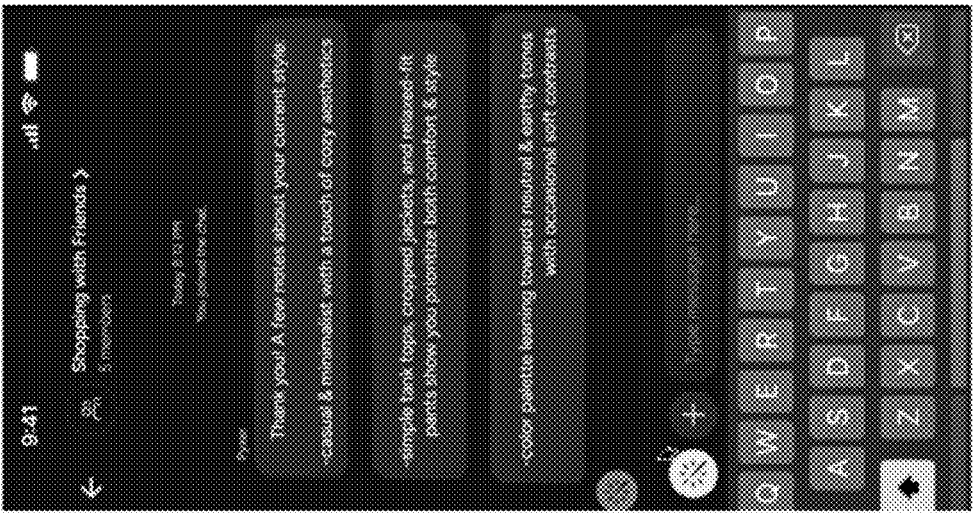
FIGS. 8A-8I are exemplary user interface illustrating conversational dialogue in a messaging embodiment.
Figure 8B:
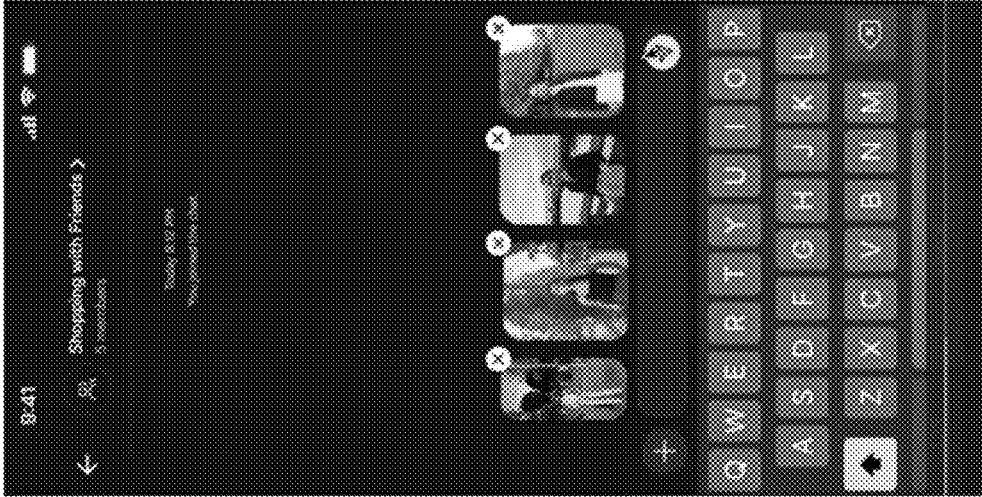
Figure 8A:
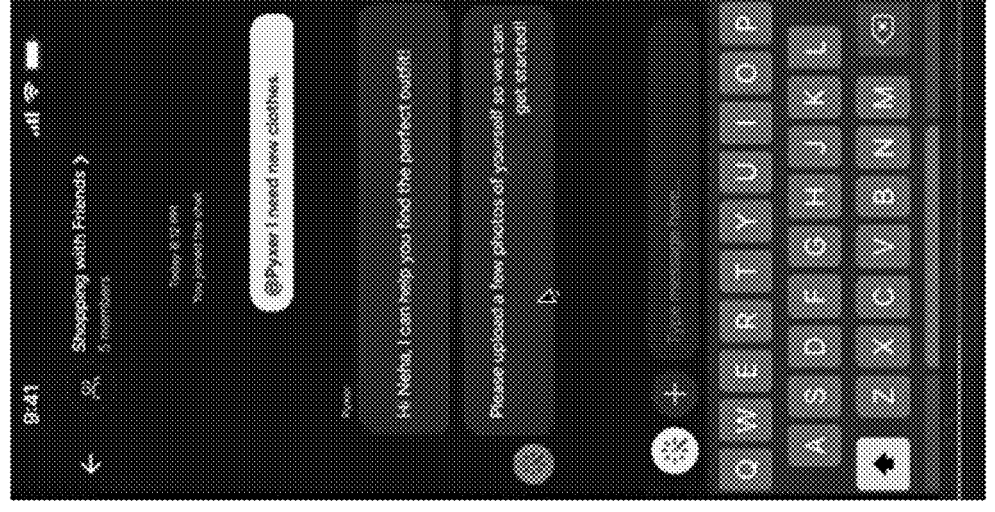
Figure 8F:
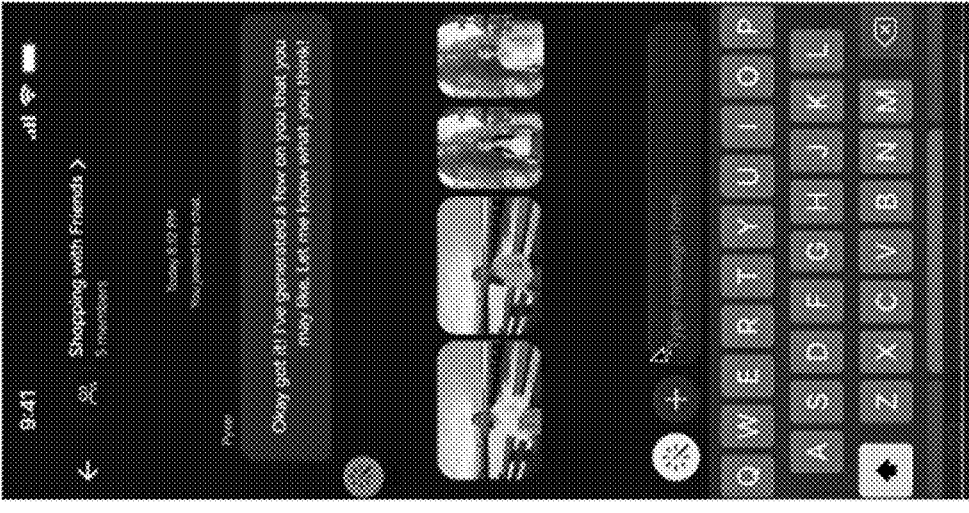
Figure 8E:
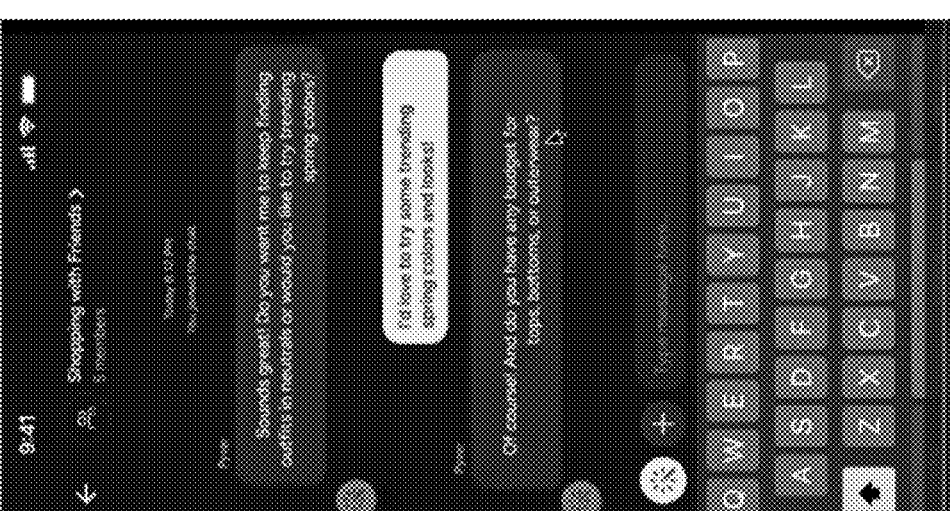
Figure 8D:
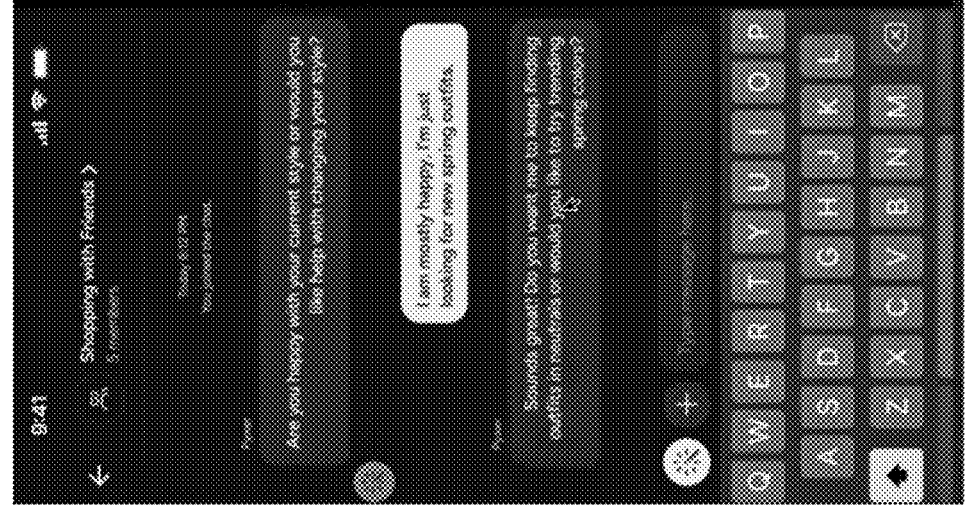
Figure 8I:
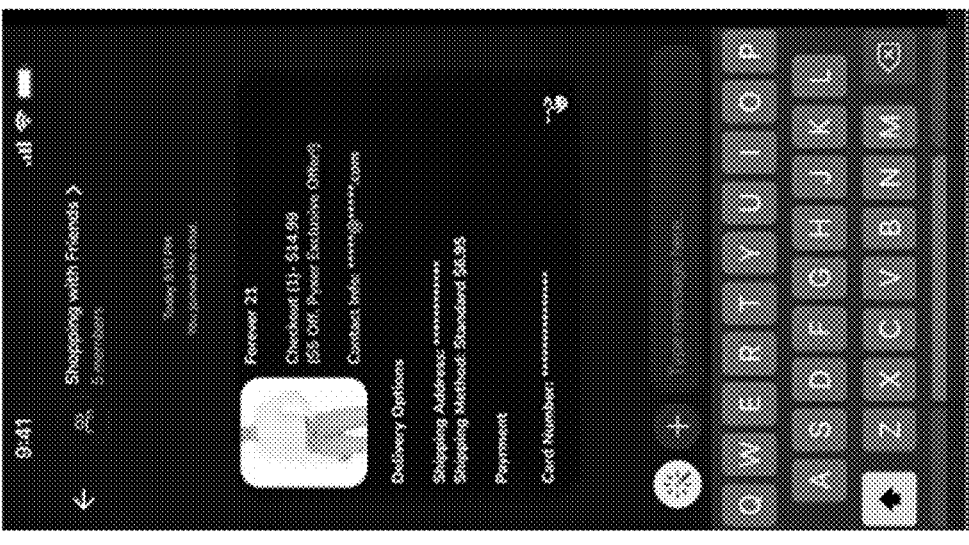
Figure 8H:
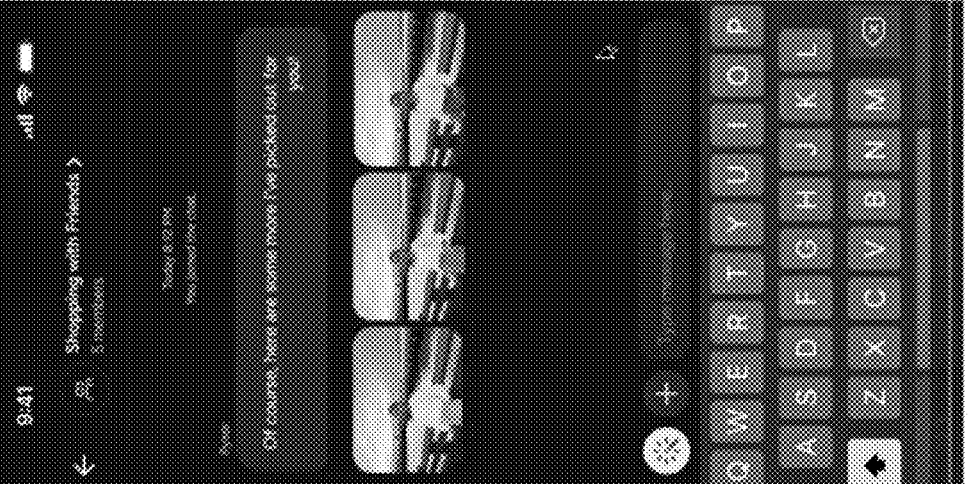
Figure 8G:
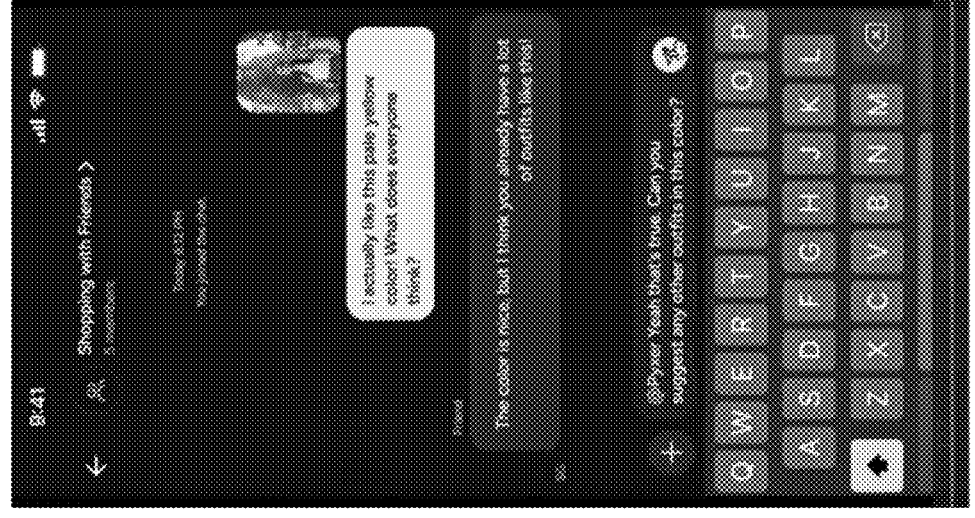

FIG. 4 is a diagram illustrating an exemplary computer that may perform processing in some embodiments. Exemplary computer 400 may perform operations consistent with some embodiments. The architecture of computer 400 is exemplary. Computers can be implemented in a variety of other ways. A wide variety of computers can be used in accordance with the embodiments herein.

Processor 401 may perform computing functions such as running computer programs. The volatile memory 402 may provide temporary storage of data for the processor 401. RAM is one kind of volatile memory. Volatile memory typically requires power to maintain its stored information. Storage 403 provides computer storage for data, instructions, and/or arbitrary information. Non-volatile memory, which can preserve data even when not powered and including disks and flash memory, is an example of storage. Storage 403 may be organized as a file system, database, or in other ways. Data, instructions, and information may be loaded from storage 403 into volatile memory 402 for processing by the processor 401.

The computer 400 may include peripherals 405. Peripherals 405 may include input peripherals such as a keyboard, mouse, trackball, video camera, microphone, and other input devices. Peripherals 405 may also include output devices such as a display. Peripherals 405 may include removable media devices such as CD-R and DVD-R recorders/players. Communications device 406 may connect the computer 100 to an external medium. For example, communications device 406 may take the form of a network adapter that provides communications to a network. A computer 400 may also include a variety of other devices 404. The various components of the computer 400 may be connected by a connection medium such as a bus, crossbar, or network.

FIG. 5 is a flow chart illustrating an exemplary method that may be performed in some embodiments. The system performs a message monitoring process that evaluates messages among multiple users in a communications session using a communications system or application. The system determines the content and/or context of the textual dialogue among the users. The system may identify key words or phrases that indicate that a user is interested in apparel and/or clothing items. Either the system may automatically generate and recommend accessories, apparel and/or clothing items and transmit via the communication system one or more images generated by the system depicting one or more users in the image wearing the recommended accessories, apparel and/or clothing items.

Also, the system may receive a request from one of the user to recommend apparel and/or clothing items. In response to the request received from a user via the communications system or application, the system generates and recommends accessories, apparel and/or clothing items and transmits via the communication system one or more images generated by the system depicting one or more users in the image wearing the recommended apparel and/or clothing items.

During the communications session among the users, a user may also upload or add an image depicting accessories, apparel and/or clothing items. The system evaluates the added image and determines similar accessories, apparel and/or clothing item styles. Based on the added image, the system generates and recommends accessories, apparel and/or clothing items and transmits via the communication system one or more images generated by the system depicting one or more users in the image wearing the recommended apparel and/or clothing items.

In some embodiments, the system performs a process according to the process flow chart 500. In step 500, one or more servers receive a plurality of messages via a messaging communications user interface (such as those described with regard to FIGS. 6A-7D). For example, a plurality of messages, are received by the one or more servers that were input via a message user interface from a first user and a plurality of messages from a second user. The first user and the second user transmit their respective plurality of messages during the course of a dialogue among the users.

In step 520, the one or more servers execute a service or application that monitors the electronic message dialogue among the user. The one or more servers maintains a history of the dialogue among the users. For example, a server may store in a storage device the messages transmitted among the user and may store in the storage device the message transmitted to a chat agent of the system.

In step 530, the one or more servers utilize a conversational AI model to interact with the first user and the second user. In some modes of operation, the chat agent converses with either of the users during the communications session.

The system may evaluate the electronic message dialogue and determines whether a message indicates a reference to an accessory, apparel or clothing item. For example, the system may search the electronic message dialogue for key words (such as shirt, pants or hat). Additionally, the system may prepare and generate a prompt to a generative AI system (for example, a system using a large language model (LLM)). The prompt may instruct the generative AI system to identify accessory, apparel and/or clothing items discussed or reference in the message dialogue. In response to executing the LLM, the system receives back a formatted list of items identified by the LLM that were discussed in the message dialogue.

Based on one or more items in the listing, the system may generate an image of a recommended accessory, apparel or clothing item.

In step 540, the system determines by the conversational AI model one or more messages to transmit to the first user and/or to the second user. The system uses the conversational AI model to generate electronic messaging to one or more users based on some all or all of the dialogue among the users.

In some modes of operation, the system receives one more added images and then analyzes the image to determine a conversation message to send to one or more users. For example, the system inputs the received image into a visual AI model or other type of machine learning model and classifies the types of apparel or clothing items in the image. The system may generate a message to the user that added the image to the conversation to confirm whether the user that added the image would like to receive recommendations for similar apparel or clothing (of the classified type of objects identified in the added image).

In some embodiments, the generated one or more images comprise an image with a likeness of the second user, and wherein the AI system was trained one or more images of the second user.

In some embodiments, the one or more images comprise multiple images of the first user wherein the multiple images comprise images with a likeness of the first user wearing the same clothing items, but with the clothing items in different colors for the same clothing item in the multiple images.

In some embodiments, t the one or images depict a likeness of the first user and a likeness of the second user depicted in a single image, wherein the generated image of the users comprise accessory, apparel and/or clothing item components suggested by the AI system.

In step 550, the system, based on the plurality of messages, generating by a visual AI model, one or more images depicting a person with accessory, apparel and/or clothing components.

In some embodiments, the generated one or more images comprise an image with a likeness of the first user, and wherein the AI system (e.g., the AI visual model) was trained one or more images of the first user.

In step 560, the system transmits, for display via the messaging user interface, the generated one or more images to the first user and/or the second user.

In some embodiments, the visual AI model is previously trained on one or more images of a user. For example, the system receives one or more images depicting a plurality of users wearing various apparel items, the one or more images depicting a likeness of the first user and of the second user. The system inputs the received one or more images into a visual AI model, the visual AI model being trained to identify apparel patterns and accessory, apparel and/or clothing item components. The system then uses the trained visual AI model to identify apparel patterns (and also clothing or accessory items) from the received one or more images and extracts the accessory, apparel and/or clothing item components from the one or more images.

FIGS. 6A-6K are exemplary user interface illustrating conversational dialogue in a messaging embodiment. The figures depict a conversational dialogue among users in a communication session where the users discuss various topics. The user interface provides an input for text and/or images. In the example, dialogue the user discusses what to wear to an outing to a beach picnic. A first user asks a question about what top to wear to a beach picnic, and discusses what the user plans to wear. A second user responds to the first user and recommends wearing a sweater and the weather will be chilly.

A message is created to send to the chat agent (named Pyxer) asking the question of "do you have any ides of what sweaters to wear at the beach. In the example, a user input the message to the chat agent. However, the system may automatically propose a question to one or more users asking would the user like Pyxer to recommend an accessory, apparel or clothing items. The chat agent processes the chat dialogue of the user to determine what relevant accessories, apparel or clothing items may suggest based on the context of the chat dialogue (such as the weather, temperature, location of an event, a type of event such as a wedding, party, going to a restaurant, going out dancing, sports activity, leisure activity, etc.).

In response to a confirmation of providing a recommendation, the system uses the dialogue of the users and determines one or more accessories, apparel and/or clothing items in which to generate an or images via a visual AI model and then transmits the generated image to the users for presentation via the communication user interface.

The system may use key words, tokens or other information in the dialogue to cause the visual AI model of a type of image and which user to create an image for depicting a likeness of the user wearing the generated accessories, apparel and/or clothing items. In some embodiments, the system generates a prompt with some or all of the dialogue and executes a large language model (LLM) instructing the LLM to generate parameters for input into the visual AI model. For example, the prompt may instruct the LLM to create a data structure listing the parameters that may be input to the visual AI model, such as list the type, color and or style of an accessory, apparel and/or clothing items.

The LLM generates an output structure identifying the types of the accessories, apparel and/or clothing items to be generated. The system then provides as input the visual AI model the generated output structure. Additionally, the name or user identifier of a particular user may be input to the visual AI model. When a name or user identifier of a particular user identifier is input into the visual AI model, then the visual AI model generates images depicting a likeness of the user, where the visual AI model was previously trained with images of specific users. Where a name or user identifier of a particular user in not input into the visual AI model, then the visual AI model may generate generic images with a likeness of other people.

In response to the input with the generated output structure and the name or identifier of a particular user, the AI model generates one or more images depicting the user wearing one or more accessories, apparel or clothing items. In the example dialogue, the system generated an image showing depicting a likeness of the first user wearing a sweater and a skirt that the first user indicated that she planned to wear to the beach. The chat agent further describes a description about the image (e.g., that the white knit sweater would be a trendy choice for the beach.) The generated message about the image indicates some of the context for the wearing of the apparel (e.g., indicating the wearing the white knit sweater at the beach location).

One the image is generated and transmitted to the users, any one or more of the users may provide questions or comments to the chat agent. In response, the chat agent then uses the questions or comments to further generate new images. For example, a user asks the question about "what about a colorful one?" noting that the white might be too basic. In some embodiments, the system may then generate a new prompt instructing the LLM to create a new output structure with using the previous dialogue, but to change the output structure with the new received dialogue. In other embodiments, the system may identify the changes to be made to the image, and cause the input to the visual AI model to change with respect to the identified changes (such as a colorful one).

In example, the system generates using the visual AI model, multiple images depicting the same image as the originally generated image depicting a likeness of the user, but with a sweater showing in different colors (such as blue, pink, green, etc.) than the original image which originally shows the sweater in white. Each of the users of the communication session may receive the new generated images. In the example, one of the users then comments indicating that the blue one looks best on you.

FIGS. 7A-7D are exemplary user interface illustrating conversational dialogue in a messaging embodiment. The figures depict a conversational dialogue of a plurality of users in a communication session with a chat agent (referred to as Pyxer). The user interface provides an input for text and/or images. In this example, a user requests the chat agent to generate pink bridesmaid dresses. The system may determine that multiple users should be depicted in a generated image. For example, the system may identify the particular users that are participating in the communication session. The system may then cause the visual AI model to generate an image depicting a likeness of the multiple users in the image. In some embodiments, the visual AI model has been previously trained with a dataset of one or more images of particular users and the users name and/or user identifier. The system then generates a image depicting a likeness of the multiple users with one or more accessories, apparel and/or clothing items based on the context of the dialogue of the communications session.

In this example, the system generates a first image with the likeness of multiple users of the communication session. The generated first image is transmitted to each of the multiple users of the communication session. Any one or more of the multiple users may provide comments and/or questions to the chat agent. The system evaluates the comments and/or question (similar to the process as described with respect to FIGS. 6A-6K) and then generates one or more new images which change some aspect of the accessories, apparel and/or clothing items in the first generated image.

In the example, a comment is made to cause the change agent to generate pink bridesmaid dresses. In this example, the system causes the visual AI model to create a similar second image as to the first image, but with the color of the bridesmaid dresses being changed from the first color of maroon to a second color of pink.

The system may use the first generated image and input that image back into the visual AI model with a parameter for the change of color of the clothing item. This provides processing efficiency where the model does not have to completely generate a new image, but need only change particular aspects of the first generated images, such as the color of a clothing item.

In some embodiments, the system generates a new data structure using an LLM for input into the visual AI model. The new data structure changes a color parameter from an original color maroon to a new color pink. The new data structure is used as an input into the visual AI model which then generates the new image depicting a likeness of the multiple users wearing the same clothing item as depicted in the first image, but now with a change to the color of the clothing item.

While the example describes a change to a color parameter, other parameters may be changes that cause the visual AI model to generate a new image depicting a likeness of the multiple users but with some other and/or additional changes to an accessory, apparel or clothing items.

In some embodiments, a user may input via the communications user interface, a comment or question to ask the chat agent as to what changes can be made to recommendation generated by the system. In response, the system provides a listing of changes that can be made, such a color, style, type of accessory, apparel or clothing item, etc.

In some embodiments, a user may input via the communications user interface, a comment or question to ask the chat agent to add additional accessories, apparel or clothing items. For example, after the first image is generated, a user may ask the chat agent to add a clothing item, such as scarf, or add an accessory, such as a necklace.

In response to receiving the request to add an additional accessory, apparel or clothing item, the system will, using the visual AI model, generate a new image that is based on the generated first image. The new image that is generated will include a depiction of the additional accessory, apparel or clothing item. The new generated image is then transmitted to one or more of the user in the communication session.

FIGS. 8A-8I are exemplary user interface illustrating conversational dialogue in a messaging embodiment. The figures depict a conversational dialogue with a user and the chat agent (referred to as Pyxer). The user interface provides an input for text and/or images. In this example, a user messages the chat agent that the user needs new clothes. The system evaluates the message and responds indicating for the user to upload photos.

In some embodiments, the system may determine whether or not the user has uploaded prior images or that the prior images that were upload are beyond a period of time (such as a predetermined number of days) indicating that a new set of photos should be uploaded.

In response to uploading and receiving a set of images, the system evaluates and classifying the accessories, apparel and/or clothing items of the imagery using machine learning models. The system determines a style profile for the user based on the processed images. The style profile includes a description of the user's style (e.g., casual and minimalist, formal, etc.). The style profile may include a set of accessories, apparel and/or clothing items for the determined style profile (e.g., simple tank tops, cropped jackets, relaxed fit pants, etc.). Furthermore, style profile may include color pallets that are associated with the style. The system stores the style profile for the user. The style profile is then later used to generate new imagery via the visual AI model using the style profile as an input or to influence the visual AI model to generate imagery depicting a likeness of the user.

In some embodiments, the system stores a style profile for multiple users. For a first user, the system may generate new imagery depicting the likeness of the first user using a style profile of another user. For example, a user may be considered an influencer type of user. The first user may ask the chat agent that the first user wants to see clothing that looks like the style of the other user. The system may generate new imagery depicting the likeness of the first using via the visual AI model using the style profile of the other user.

In the example, the chat agent continues dialogue with the user to fine tune or change the style profile. For example, the chat agent asks whether the user is happy with the current style or would like to change the style. The user responds with information or further images in the communications session with the chat agent that would then change the style profile of the user. In the example, dialogue with the chat agent, the user indicates that the user would like to try new spring outfits and some trending colors. Also, the chat agent asks the user about a budget for the particular clothing items. The user may respond to the chat agent and provide additional information and in response the system generates one or more new images with different accessories, apparel and/or clothing items. The system then may update the current style profile associated with the user.

In some embodiments, the system generates multiple style profile for a user. The system evaluates contextual dialogue in the communications sessions and selects a style profile for the user to generate one or more new images depicting a likeness of the user with different accessories, apparel and/or clothing items, based on the selected style profile. The style profile may include attributes of for accessories, apparel and/or clothing items such as: color, a material, similar products in a different price range, a neckline, a sleeve type, a length of the clothing item, a fit of the clothing item, a pattern on the clothing item. The system when generating an image may change any one or more of the forementioned attributed.

In the example dialogue with the user, the system generates multiple images of the user based on a style profile associated with the user. The user may select one of the generated images or indicate that the user likes a particular image. In response, the system generates dialogue to the user providing information such that the user may purchase accessories, apparel and/or clothing items depicted in the selected image. The system, via the user interface, allows the user to make a purchase for an accessory, apparel and/or clothing item.

Figure 9:
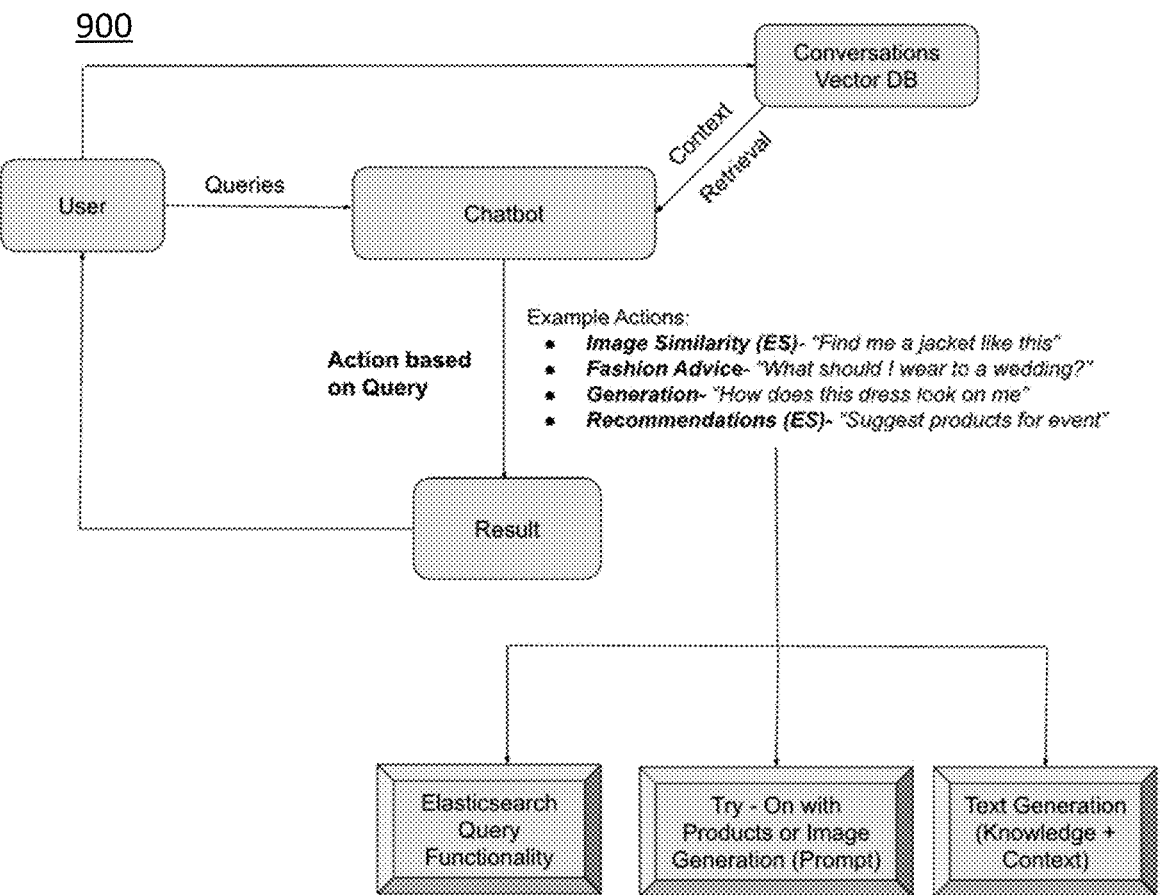
FIG. 9 is a flow chart illustrating an exemplary method that may be performed in some embodiments.

FIG. 9 is a flow chart illustrating an exemplary method that may be performed in some embodiments. The flow chart illustrates a user interacting with a chatbot. In some embodiments, the chatbot is implemented as an artificial intelligence agent with direct access to a product database thereby allowing it to process user queries (text and images), retrieve fashion trends and styling advice, run vector search queries for product recommendations, and update user preferences dynamically during runtime using a retrieval-augmented generation system.

Conversational information is stored and accessed by the system in a conversations vector database or in some other database, or other storage format. The chatbot determines contextual information based on the conversational dialogue between the user and the chatbot. Based on the context, the system determines one or more actions to be taken by the system. For example, the system may determine similarity of one image to another one or more images, and display to the user the similar images to an image provided by the user. The system may determine clothing, apparel and/or accessories suggestion in the form of providing images and textual information in response to a question submitted by the user. The system may generate an image depicting a likeness of the user in response to the user submitting or selecting an image or images of clothing, apparel and/or accessories. The system may generate and suggest images of products in response to dialogue submitted by the user.

In some embodiments, a user initiates a conversation with the chatbot via a user interface. To maintain context, the system retrieves past relevant conversations using a vector database. The chatbot guides the conversation by suggesting different filter combinations to the user. The following dialogue exemplifies an example conversation between the user and the chatbot:

User: "Can you suggest a stylish dress for a wedding?"
  Chatbot Reply: "Sure! Would you like a pastel or floral dress? Also, what's your budget?" (The system refines the query before passing it to the recommender system.)
  User: "I need a winter jacket under $150."
  Chatbot Reply: "Would you prefer something casual or formal? Also, do you have any brand preferences?" (If a user answers, the chatbot includes those filters in the prompt.)
  Once all the relevant filters are extracted, the chatbot sends the structured query to a recommender system that determines and/or generates images of accessories, clothing and/or apparel to the user.

EXAMPLES

It will be appreciated that the present disclosure may include any one and up to all of the following examples.

Example 1. A computer-implemented method for providing generative apparel recommendations, via one or more processors, configured to perform the operations of: receiving, via a messaging user interface, a plurality of messages from a first user and a plurality of messages from a second user, wherein the first user and the second user transmit the respective plurality of messages during the course of a dialogue among the users; monitoring the plurality of messages; utilizing a conversational AI model to interact with the first user and the second user; determining by the conversational AI model one or more messages to transmit to the first user and/or to the second user; based on the plurality of messages, generating by a visual AI model, one or more images depicting a person with accessory, apparel and/or clothing item components; and transmitting, for display via the messaging user interface, the generated one or more images to the first user and/or the second user.

Example 2. The method of Example 1, wherein the generated one or more images comprise an image with a likeness of the first user, and wherein the AI system was trained one or more images of the first user.

Example 3. The method of any one of Examples 1-2, wherein the generated one or more images comprise an image with a likeness of the second user, and wherein the AI system was trained one or more images of the second user.

Example 4. The method of any one of Examples 1-3, wherein the one or more images comprise multiple images of the first user wherein the multiple images comprise images with a likeness of the first user wearing the same clothing items, but with the clothing items in different colors for the same clothing item in the multiple images.

Example 5. The method of any one of Examples 1-4, wherein the one or images depict a likeness of the first user and a likeness of the second user depicted in a single image, wherein the generated image of the users comprise accessory, apparel and/or clothing item components suggested by the AI system.

Example 6. The method of any one of Examples 1-5, further comprising the operations of: receiving one or more images depicting a plurality of users wearing various apparel items, the one or more images depicting a likeness of the first user and of the second user; inputting the received one or more images into a visual AI model, the visual AI model being trained to identify apparel patterns and accessory, apparel and/or clothing item components; and identifying by the visual AI model, apparel patterns from the received one or more images and extracting accessory, apparel and/or clothing item components from the one or more images.

Example 7. The method of any one of Examples 1-6, wherein monitoring of the plurality of messages comprises the operations of: storing messages input from the first and/or second user; and determining whether the stored messages indicate a reference to apparel or clothing items.

Example 8. The method of any one of Examples 1-7, wherein utilizing a conversational AI model to interact with the first user and the user comprises the operations of: generating a prompt for submission to a large language model (LLM), wherein the prompt instructs the LLM to identify accessory, apparel and/or clothing items discussed in a messaging dialogue among user; inputting the generated prompt to the LLM, and receiving a listing of one or more accessories, apparel and/or clothing items; and based on the received listing, generating an image, via the visual AI model, depicting one of the users with the one or more accessories, apparel and/or clothing items.

Example 9. The method of any one of Examples 1-8, wherein generating by a visual AI model, one or more images depicting a person with accessory, apparel and/or clothing item components comprises: during a communications session among the first user and second user, receiving an image depicting accessories, apparel and/or clothing items; and based on the received image, inputting the image into the visual AI model.

Example 10. The method of any one of Examples 1-9, wherein transmitting, for display via the messaging user interface, comprises the operations of: during a communications session among the first and second user, receiving a request, via the messaging user interface, to generate or recommend an accessory, apparel and/or a clothing item; and based on the received request, generating by a visual AI model, one or more images depicting a person with accessory, apparel and/or clothing item components.

Example 11. A system comprising one or more processors configured to perform the operations of: receiving, via a messaging user interface, a plurality of messages from a first user and a plurality of messages from a second user, wherein the first user and the second user transmit the respective plurality of messages during the course of a dialogue among the users; monitoring the plurality of messages; utilizing a conversational AI model to interact with the first user and the second user; determining by the conversational AI model one or more messages to transmit to the first user and/or to the second user; based on the plurality of messages, generating by a visual AI model, one or more images depicting a person with accessory, apparel and/or clothing item components; and transmitting, for display via the messaging user interface, the generated one or more images to the first user and/or the second user.

Example 12. The system of Example 11, wherein the generated one or more images comprise an image with a likeness of the first user, and wherein the AI system was trained one or more images of the first user.

Example 13. The system of any one of Examples 11-12, wherein the generated one or more images comprise an image with a likeness of the second user, and wherein the AI system was trained one or more images of the second user.

Example 14. The system of any one of Examples 11-13, wherein the one or more images comprise multiple images of the first user wherein the multiple images comprise images with a likeness of the first user wearing the same clothing items, but with the clothing items in different colors for the same clothing item in the multiple images.

Example 15. The system of any one of Examples 11-14, wherein the one or images depict a likeness of the first user and a likeness of the second user depicted in a single image, wherein the generated image of the users comprise accessory, apparel and/or clothing item components suggested by the AI system.

Example 16. The system of any one of Examples 11-15, further comprising the operations of: receiving one or more images depicting a plurality of users wearing various apparel items, the one or more images depicting a likeness of the first user and of the second user;
inputting the received one or more images into a visual
AI model, the visual AI model being trained to identify
apparel patterns and accessory, apparel and/or clothing
item components; and identifying by the visual AI
model, apparel patterns from the received one or more
images and extracting accessory, apparel and/or cloth-
ing item components from the one or more images.

Example 17. The system of any one of Examples 11-16,
further comprising the operations of: storing messages
input from the first and/or second user; and determining
whether the stored messages indicate a reference to
apparel or clothing items.

Example 18. The system of any one of Examples 11-17,
wherein utilizing a conversational AI model to interact
with the first user and the user comprises the operations
of: generating a prompt for submission to a large
language model (LLM), wherein the prompt instructs
the LLM to identify accessory, apparel and/or clothing
items discussed in a messaging dialogue among user;
inputting the generated prompt to the LLM, and receiv-
ing a listing of one or more accessories, apparel and/or
clothing items; and based on the received listing, gen-
erating an image, via the visual AI model, depicting one
of the users with the one or more accessories, apparel
and/or clothing items.

Example 19. The system of any one of Examples 11-18,
wherein generating by a visual AI model, one or more
images depicting a person with accessory, apparel
and/or clothing item components comprises: during a
communications session among the first user and sec-
ond user, receiving an image depicting accessories,
apparel and/or clothing items; and based on the
received image, inputting the image into the visual AI
model.

Example 20. The system of any one of Examples 11-19,
wherein transmitting, for display via the messaging
user interface, comprises the operations of: during a
communications session among the first and second
user, receiving a request, via the messaging user inter-
face, to generate or recommend an accessory, apparel
and/or a clothing item; and based on the received
request, generating by a visual AI model, one or more
images depicting a person with accessory, apparel
and/or clothing item components.

Some portions of the preceding detailed descriptions have
been presented in terms of algorithms and symbolic repre-
sentations of operations on data bits within a computer
memory. These algorithmic descriptions and representations
are the ways used by those skilled in the data processing arts
to most effectively convey the substance of their work to
others skilled in the art. An algorithm is here, and generally,
conceived to be a self-consistent sequence of operations
leading to a desired result. The operations are those requir-
ing physical manipulations of physical quantities. Usually,
though not necessarily, these quantities take the form of
electrical or magnetic signals capable of being stored, com-
bined, compared, and otherwise manipulated. It has proven
convenient at times, principally for reasons of common
usage, to refer to these signals as bits, values, elements,
symbols, characters, terms, numbers, or the like.

It should be borne in mind, however, that all of these and
similar terms are to be associated with the appropriate
physical quantities and are merely convenient labels applied
to these quantities. Unless specifically stated otherwise as
apparent from the above discussion, it is appreciated that
throughout the description, discussions utilizing terms such as "identifying" or "determining" or "executing" or "per-
forming" or "collecting" or "creating" or "sending" or the
like, refer to the action and processes of a computer system,
or similar electronic computing device, that manipulates and
transforms data represented as physical (electronic) quanti-
ties within the computer system's registers and memories
into other data similarly represented as physical quantities
within the computer system memories or registers or other
such information storage devices.

The present disclosure also relates to an apparatus for
performing the operations herein. This apparatus may be
specially constructed for the intended purposes, or it may
comprise a general purpose computer selectively activated
or reconfigured by a computer program stored in the com-
puter. Such a computer program may be stored in a computer
readable storage medium, such as, but not limited to, any
type of disk including floppy disks, optical disks, CD-
ROMs, and magnetic-optical disks, read-only memories
(ROMs), random access memories (RAMs), EPROMs,
EEPROMs, magnetic or optical cards, or any type of media
suitable for storing electronic instructions, each coupled to
a computer system bus.

Various general purpose systems may be used with pro-
grams in accordance with the teachings herein, or it may
prove convenient to construct a more specialized apparatus
to perform the method. The structure for a variety of these
systems will appear as set forth in the description above. In
addition, the present disclosure is not described with refer-
ence to any particular programming language. It will be
appreciated that a variety of programming languages may be
used to implement the teachings of the disclosure as
described herein.

The present disclosure may be provided as a computer
program product, or software, that may include a machine-
readable medium having stored thereon instructions, which
may be used to program a computer system (or other
electronic devices) to perform a process according to the
present disclosure. A machine-readable medium includes
any mechanism for storing information in a form readable
by a machine (e.g., a computer). For example, a machine-
readable (e.g., computer-readable) medium includes a
machine (e.g., a computer) readable storage medium such as
a read only memory ("ROM"), random access memory
("RAM"), magnetic disk storage media, optical storage
media, flash memory devices, etc.

In the foregoing disclosure, implementations of the dis-
closure have been described with reference to specific
example implementations thereof. It will be evident that
various modifications may be made thereto without depart-
ing from the broader spirit and scope of implementations of
the disclosure as set forth in the following claims. The
disclosure and drawings are, accordingly, to be regarded in
an illustrative sense rather than a restrictive sense.

What is claimed is:

1. A computer-implemented method for providing gen-
erative apparel recommendations, via one or more proces-
sors, configured to perform the operations of:
    iteratively training a visual AI model to identify clothing
        patterns and/or apparel components based on one or
        more input images;
    identifying, by the trained visual AI model, clothing
        patterns and/or apparel components based on one or
        more images associated with a user;
    receiving, via a messaging user interface, a plurality of
        messages from a first user and a plurality of messages
        from a second user, wherein the first user and the second user transmit the respective plurality of messages during the course of a dialogue among the first user and second user;

monitoring the plurality of messages;

utilizing a conversational AI model to interact with the first user and the second user via the messaging user interface thereby generating a conversational thread;

determining by the conversational AI model a plurality of messages to transmit to the first user and/or to the second user, wherein output generated from the conversational AI model is displayed via the messaging user interface;

displaying, via the messaging user interface, the plurality of messages in the conversational thread;

determining a set of apparel preferences based on the conversational thread of the users and the identified clothing patterns and/or apparel components;

based on the determined set of apparel preferences, generating by another trained visual AI model, one or more images depicting a person with accessory, apparel and/or clothing item components, wherein each of the depicted images depict a likeness of the first user and/or the second user; and transmitting, for display via the messaging user interface, the generated one or more images to the first user and/or the second user; and displaying, via the messaging user interface, the generated one or more images in the conversational thread.

2. The method of claim 1, wherein the generated one or more images depict both of the first user and the second user with one or more another trained visual AI model generated accessories, apparel and/or clothing item components.

3. The method of claim 1, further comprising:

segmenting each of the input images into distinct regions of segmented clothing components, wherein the visual AI model is trained using the segmented clothing components.

4. The method of claim 1, wherein the one or more input images comprise multiple images of the first user wherein the multiple images comprise images with a likeness of the first user wearing the same clothing items, but with the clothing items in different colors and/or different design variations for the same clothing item in the multiple images.

5. The method of claim 1, wherein the one or more generated images depict a likeness of the first user and a likeness of the second user depicted in a single image, wherein the generated image of the users comprise accessory, apparel and/or clothing item components.

6. The method of claim 1, further comprising the operations of:

receiving one or more images depicting a plurality of users wearing various apparel items, the one or more images depicting a likeness of the first user and of the second user;

inputting the received one or more images into the visual AI model, the visual AI model being trained to identify apparel patterns and accessory, apparel and/or clothing item components; and identifying by the visual AI model, apparel patterns from the received one or more images and extracting accessory, apparel and/or clothing item components from the one or more images.

7. The method of claim 1, wherein monitoring of the plurality of messages comprises the operations of:

storing messages input from the first and/or second user; and determining whether the stored messages indicate a reference to apparel or clothing items.

8. The method of claim 1, wherein utilizing the conversational AI model to interact with the first user and the user comprises the operations of:

generating a prompt for submission to a large language model (LLM), wherein the prompt instructs the LLM to identify accessory, apparel and/or clothing items discussed in a messaging dialogue among the first user and the second user;

inputting the generated prompt to the LLM, and receiving a listing of one or more accessories, apparel and/or clothing items; and based on the received listing, generating an image, via the another trained visual AI model, depicting one of the first user or second user with the one or more accessories, apparel and/or clothing items.

9. The method of claim 1, wherein generating by the another trained visual AI model, one or more images depicting a person with accessory, apparel and/or clothing item components comprises:

during a communications session among the first user and second user, receiving an image depicting accessories, apparel and/or clothing items; and based on the received image, inputting the image into the another trained visual AI model.

10. The method of claim 1, wherein transmitting, for display via the messaging user interface, comprises the operations of:

during a communications session among the first and second user, receiving a request, via the messaging user interface, to generate or recommend an accessory, apparel and/or a clothing item; and based on the received request, generating by the another trained visual AI model, one or more images depicting a person with accessory, apparel and/or clothing item components.

11. A system comprising one or more processors configured to perform the operations of:

iteratively training a visual AI model to identify clothing patterns and/or apparel components based on one or more input images;

identifying, by the trained visual AI model, clothing patterns and/or apparel components based on one or more images associated with a user;

receiving, via a messaging user interface, a plurality of messages from a first user and a plurality of messages from a second user, wherein the first user and the second user transmit the respective plurality of messages during the course of a dialogue among the first user and second user;

monitoring the plurality of messages;

utilizing a conversational AI model to interact with the first user and the second user via the messaging user interface thereby generating a conversational thread;

determining by the conversational AI model a plurality of messages to transmit to the first user and/or to the second user, wherein output generated from the conversational AI model is displayed via the messaging user interface;

displaying, via the messaging user interface, the plurality of messages in the conversational thread;

determining a set of apparel preferences based on the conversational thread of the users and the identified clothing patterns and/or apparel components;

based on the determined set of apparel preferences, generating by another trained visual AI model, one or more images depicting a person with accessory, apparel and/or clothing item components, wherein each of the depicted images depict a likeness of the first user and/or the second user; and transmitting, for display via the messaging user interface, the generated one or more images to the first user and/or the second user; and displaying, via the messaging user interface, the generated one or more images in the conversational thread.

12. The system of claim 11, wherein the generated one or more images depict both of the first user and the second user with one or more another trained visual AI model generated accessories, apparel and/or clothing item components.

13. The system of claim 11, further comprising:

segmenting each of the input images into distinct regions of segmented clothing components, wherein the visual AI model is trained using the segmented clothing components.

14. The system of claim 11, wherein the one or more input images comprise multiple images of the first user wherein the multiple images comprise images with a likeness of the first user wearing the same clothing items, but with the clothing items in different colors for the same clothing item in the multiple images.

15. The system of claim 11, wherein the one or more generated images depict a likeness of the first user and a likeness of the second user depicted in a single image, wherein the generated image of the users comprise accessory, apparel and/or clothing item components.

16. The system of claim 11, further comprising the operations of:

receiving one or more images depicting a plurality of users wearing various apparel items, the one or more images depicting a likeness of the first user and of the second user;

inputting the received one or more images into the visual AI model, the visual AI model being trained to identify apparel patterns and accessory, apparel and/or clothing item components; and identifying by the visual AI model, apparel patterns from the received one or more images and extracting accessory, apparel and/or clothing item components from the one or more images.

17. The system of claim 11, further comprising the operations of:

storing messages input from the first and/or second user; and determining whether the stored messages indicate a reference to apparel or clothing items.

18. The system of claim 11, wherein utilizing the conversational AI model to interact with the first user and the user comprises the operations of:

generating a prompt for submission to a large language model (LLM), wherein the prompt instructs the LLM to identify accessory, apparel and/or clothing items discussed in a messaging dialogue among the first user and the second user;

inputting the generated prompt to the LLM, and receiving a listing of one or more accessories, apparel and/or clothing items; and based on the received listing, generating an image, via the another trained visual AI model, depicting one of the first user or second user with the one or more accessories, apparel and/or clothing items.

19. The system of claim 11, wherein generating by the another trained visual AI model, one or more images depicting a person with accessory, apparel and/or clothing item components comprises:

during a communications session among the first user and second user, receiving an image depicting accessories, apparel and/or clothing items; and based on the received image, inputting the image into the another trained visual AI model.

20. The system of claim 11, wherein transmitting, for display via the messaging user interface, comprises the operations of:

during a communications session among the first and second user, receiving a request, via the messaging user interface, to generate or recommend an accessory, apparel and/or a clothing item; and based on the received request, generating by the another trained visual AI model, one or more images depicting a person with accessory, apparel and/or clothing item components.

\* \* \* \* \*